US009258216B2

(12) United States Patent  (10) Patent No.: US 9,258,216 B2
Sung et al.  (45) Date of Patent: Feb. 9, 2016

(54) METHODS AND SYSTEMS FOR TRANSMITTING PACKETS THROUGH NETWORK INTERFACES

(71) Applicant: Pismo Labs Technology Limited, Hong Kong (HK)

(72) Inventors: Patrick Ho Wai Sung, Hong Kong (HK); Kam Chiu Ng, Hong Kong (HK); Wan Chun Leung, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 101 days.

(21) Appl. No.: 13/935,576

(22) Filed: Jul. 5, 2013

(65) Prior Publication Data

US 2014/0286343 A1   Sep. 25, 2014

Related U.S. Application Data

(63) Continuation-in-part of application No. 12/646,774, filed on Dec. 23, 2009.

(51) Int. Cl.
*H04L 12/707* (2013.01)
*H04L 12/721* (2013.01)
*H04L 12/24* (2006.01)
*H04L 29/06* (2006.01)
*H04L 12/26* (2006.01)

(52) U.S. Cl.
CPC ............ *H04L 45/24* (2013.01); *H04L 41/0668* (2013.01); *H04L 45/124* (2013.01); *H04L 45/44* (2013.01); *H04L 69/14* (2013.01); *H04L 43/0829* (2013.01); *H04L 63/0272* (2013.01)

(58) Field of Classification Search
CPC ......... H04L 45/24; H04L 45/44; H04L 43/08; H04L 47/10; H04L 45/02; H04L 45/14; H04L 45/125; H04L 12/5602; H04L 47/125
See application file for complete search history.

(56) References Cited

U.S. PATENT DOCUMENTS

| | | | |
|---|---|---|---|
| 6,470,390 B1 * | 10/2002 | Westfield | 709/227 |
| 7,590,054 B1 * | 9/2009 | Holness et al. | 370/225 |
| 8,806,030 B2 * | 8/2014 | Zhu et al. | 709/228 |
| 2011/0194405 A1 * | 8/2011 | Abbas | 370/221 |
| 2011/0222413 A1 * | 9/2011 | Shukla et al. | 370/241.1 |
| 2011/0276699 A1 * | 11/2011 | Pedersen | 709/227 |
| 2012/0127885 A1 | 5/2012 | Karaoguz et al. | |

FOREIGN PATENT DOCUMENTS

WO    2011143094 A2    11/2011
WO    2011147381 A2    12/2011

OTHER PUBLICATIONS

International Search Report in International Application No. PCT/IB2013/055499, mailed on Apr. 18, 2014.
Written opinion of the International Searching Authority in International Application No. PCT/IB2013/055499, mailed on Apr. 18, 2014.

* cited by examiner

*Primary Examiner* — Albert T Chou

(57) ABSTRACT

A method carried out by a first communications device for transmitting data packets, wherein the first communications device comprises a plurality of network interfaces. Data packets are transmitted through a first network interface when a first condition is satisfied, and through a second network interface when a second condition is satisfied. In one of the embodiments, the plurality of network interfaces are classified into a plurality of groups of network interfaces according to a first group of conditions, and the first network interface and second network interface belong to two different groups of network interfaces.

32 Claims, 15 Drawing Sheets

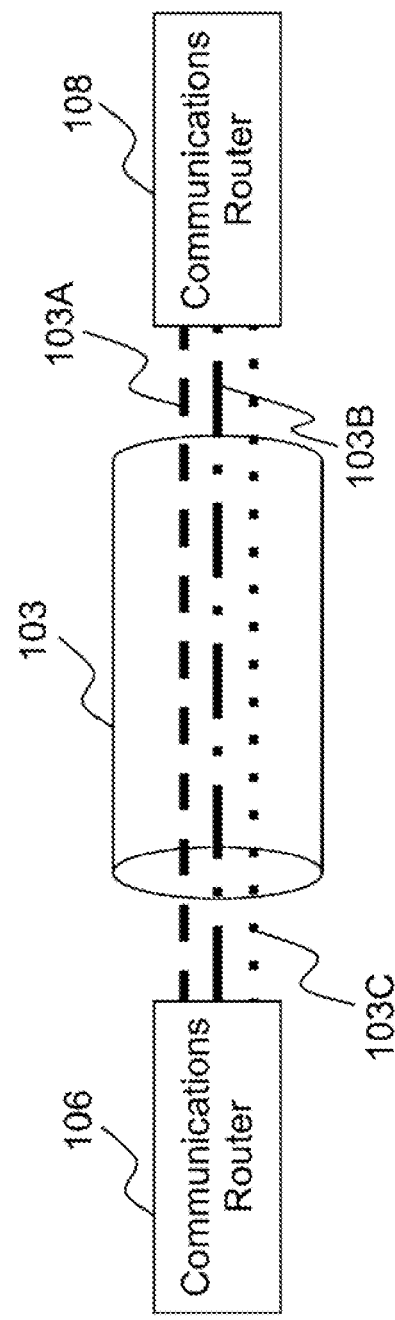

| Group | Ranking | Ranking |
|---|---|---|
| First | First | Second |
| Second | Second | Third |
| Third | Third | First |
| Fourth | Fourth | Fourth |
| Fifth | Fifth | Fifth |

Fig. 7

METHODS AND SYSTEMS FOR TRANSMITTING PACKETS THROUGH NETWORK INTERFACES

RELATED APPLICATIONS

The present application is a Non-provisional Continuation-in-part application which claims the benefits of and is based on Non-provisional application Ser. No. 12/646,774 titled "Throughput Optimization for Bonded Variable Bandwidth Connections", filed on 23 Dec. 2009.

TECHNICAL FIELD

The present invention relates in general to the field of computer networks. More particularly, the present invention relates to methods and systems for transmitting data packets at a first communications router comprising a plurality of network interfaces. Data packets are transmitted through one or more network interfaces based on whether certain conditions are satisfied or not.

BACKGROUND

A multi Wide Area Network (WAN) Site-to-Site VPN router is a router that supports aggregating the bandwidth of multiple interconnections, e.g., WAN connections for accessing one or more remote private networks. In some implementations, each TCP/IP session is routed to only one WAN. In this configuration, a single TCP file transfer session can only utilize the bandwidth of one WAN connection on each end. For example, in a session based site-to-site virtual private network (VPN) connection VPN traffic is routed to multiple WAN connections between two sites (e.g., sites A and B).

In one implementation, M×N tunnels are initially formed between the WAN connections where M and N are the number of WAN network connections of site A and site B, respectively. Application TCP/IP sessions are then routed over the different tunnels. It is notable, however, that while a session based site-to-site VPN is able to utilize different tunnels for different sessions, a single download session in this type of connection is only able to utilize one tunnel.

In order to increase throughput of single data transfer sessions, routing schemes have been created in an attempt to utilize multiple WAN connections for a single TCP/IP session. In some cases channel bonding is implemented. For example, in bonded site-to-site VPN connections on multi WAN routers, data from a single TCP/IP session is distributed to multiple tunnels. In these arrangements, the M×N tunnels are utilized according to their respective uplink or downlink bandwidth, and the amount of data in a single session that is sent over these tunnels is distributed in proportion to the individual bandwidth ratios of the tunnels. These solutions, however, still fail to take into the account that some tunnels should not be used for transmitting data because of one or more conditions. Furthermore, these solutions also do not take into account that some network interfaces fail to satisfy one or more conditions, and thus those network interfaces should not be used for transmitting data.

SUMMARY OF INVENTION

Accordingly, the present disclosure provides for devices, systems, and methods which select established end-to-end connections by classifying established end-to-end connections into a first group and at least one non-first group of established end-to-end connection(s), wherein the first group of established end-to-end connection(s) satisfy all of one or more conditions and wherein the at least one non-first group of established end-to-end connection(s) does not satisfy all of the one or more conditions. By using conditions, embodiments of the present invention are able to select established end-to-end connections that have satisfied the conditions to transmit data packets while not using non-satisfactory established end-to-end connections to transmit data packets.

According to one embodiment of the present invention, a communications device transmits data packets through a first network interface when a first condition is satisfied and transmits data packets through a second network interface when a second condition is satisfied. According to one embodiment of the present invention, the first condition is satisfied when a connection is established through the first network interface. The second network interface is then used as a backup network interface that the communications device will use it when the first network interface fails the first condition. In order to allow a quick use of the second network interface, the second network interface is maintained to be active by transmitting packets through the network interface periodically.

According to one embodiment of the present invention, error correction packets, management packets and/or data packets through the second network interface when a third condition is met. This allows utilization of the second network interface to increase overall network throughput. According to one embodiment of the present invention, the third condition is satisfied if a predefined number of packet loss within a predefined time period is detected at the first network interface.

According to one embodiment of the present invention, a communications device stops transmitting data packets through the second network interface and starting transmitting data packets through the first network interface if a fourth condition is satisfied. The fourth condition is based on a predefined number of packet loss at the second network interface within a predefined time period.

DISCLOSURE OF THE INVENTION

The ensuing description provides preferred exemplary embodiment(s) and exemplary embodiments only, and is not intended to limit the scope, applicability or configuration of the invention. Rather, the ensuing description of the preferred exemplary embodiment(s) and exemplary embodiments will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "secondary storage" and "main memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data. A machine-readable medium can be realized by virtualization, and can be a virtual machine readable medium including a virtual machine readable medium in a cloud-based instance.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processing unit(s) may perform the necessary tasks. A processing unit(s) can be a CPU, an ASIC semiconductor chip, a semi-conductor chip, a logical unit, a digital processor, an analog processor, a FPGA or any processor that is capable of performing logical and arithmetic functions. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. A processing Links) can be realized by virtualization, and can be a virtual processing unit(s) including a virtual processing unit in a cloud-based instance.

An end-to-end connection can use connection-oriented protocol, such as Transmission Control Protocol (TCP), or connectionless protocol, such as User Datagram Protocol (UDP), to transmit data packets. Well-known protocols for deploying end-to-end connections include Layer 2 Tunnelling Protocol (L2TP), secure shell (SSH) protocol, Multi-protocol Label Switching (MPLS), and Microsoft's Point-to-Point Tunnelling Protocol (PPTP). A connection connected to a network interface is in the form of optical fiber, Ethernet, ATM, Frame Relay, T1/E1, IPv4, IPv6, wireless technologies, Wi-Fi, WiMax, High-Speed Packet Access technology, 3GPP Long Term Evolution (LTE) or the like.

A network interface can be a virtual network interface, including a virtual network interface in a cloud based instance.

FIG. 1A illustrates a network environment according to one of the embodiments of the present invention. Communications router 106 establishes an aggregated end-to-end connection 103 with communications router 108. Aggregated end-to-end connection 103 comprises a plurality of established end-to-end connections. The plurality of established end-to-end connections is classified into a plurality of groups. For better illustration, group 103A represents a first group of established end-to-end connections, group 103B represents a second group of established end-to-end connections, and group 103C represents all other established end-to-end connections that do not belong to the first group or the second group of established end-to-end connections. Classification of established end-to-end connections into group 103A, 103B, or 103C is discussed in further detail herein. Alternatively, the plurality of established end-to-end connections is classified into multiple groups.

Communications routers 106 and 108 have one or more network interfaces according to one of the embodiments. Communications router 106 establishes a plurality of established end-to-end connections via one or more of its network interfaces with one or more network interfaces of communications router 108.

In one of the embodiments, after the classification of established end-to-end connections into groups 103A, 103B and 103C, data packets are transmitted by communications router 106 via different groups of established end-to-end connections according to conditions set by a user, manufacturer or administrator of communications router 106.

In one of the embodiments, after the classification of established end-to-end connections into groups 103A, 103B and/or 103C, different types of packets are transmitted by communications router 106 via different groups of established end-to-end connections according to conditions set by a user, manufacturer or administrator of communications router 106 and type of packets.

Aggregated End-to-End Connection

A plurality of established end-to-end connections are aggregated, combined or bonded together to form one aggregated end-to-end connection, such as aggregated end-to-end connection 103. Those skilled in the arts would appreciate that there are myriad ways to aggregate, combine, or bond a plurality of established end-to-end connections to form one aggregated end-to-end connection. An aggregated end-to-end connection is perceived as one end-to-end connection by sessions or applications that are using it. An aggregated end-to-end connection can be perceived as a tunnel, a virtual private network or connection or connectionless oriented connection. For example, aggregated end-to-end connection 103 is a TCP connection. In another example, an aggregated end-to-end connection 103 is a UDP connection. In another example, aggregated end-to-end connection is an aggregation of a plurality of tunnels, and each tunnel is linked between communications router 106 and communications router 108. In another example, aggregated end-to-end connection 103 is a VPN tunnel, comprising a plurality of established end-to-end connections, and each established end-to-end connection is linked between communications router 106 and communications router 108.

Generally, communications router 106 encapsulates data packets originating from a transmitting host into at least one data packet. For readability, the data packets originating from a transmitting host are referred to as original data packets. The transmitting host can be connected to communications router 106 through a cable, a wireless connection, a near-field connection transmission or through another network device. When communications router 108 receives the data packets that have encapsulated the original data packets, communications router 108 decapsulates the original data packets from the data packets and then forward the original data packets to a receiving host or node.

There are myriad ways to encapsulate original data packets in data packets sent by communications router 106. In particular, communications router 106 may tunnel original data packets between its logical endpoints using known layer-2 and/or layer-3 tunneling protocols, such as the Layer-2 Tunneling Protocol (L2TP) and the Generic Routing Encapsulation (GRE) protocol. In this case, one or more tunnel headers are prepended to a data packet to appropriately route the data packet along the virtual circuit. The Multi-Protocol Label Switching (MPLS) protocol may be used as a tunneling mechanism for establishing layer-2 virtual circuits or layer-3 network-based VPNs through an IP network.

Communications router 106 may use TCP, UDP or other communication protocols as the communication protocol for an established end-to-end connection. One of the biggest challenges faced when using aggregated end-to-end connection is to re-order data packets received among established end-to-end connections because received data packets may arrive at the communications router 108 out-of-order. If communications router 108 delivers the received data packets too early to the receiving host, the receiving host may consider those data packets that have not been received as lost data packets even if those data packets eventually arrives. One way to overcome this challenge is when communications router 106 transmits data packets to communications router 108, communications router 106 assigns each data packet with a sequence number. Communications router 108 can then re-order the data packets according to the sequence number.

Between communications router 106 and communications router 108, there can be one or more aggregated end-to-end connections. Each aggregated end-to-end connection has its own established end-to-end connections. For example, a first aggregated end-to-end connection may have ten established end-to-end connections while a second aggregated end-to-end connection may have five established end-to-end connections. The first aggregated end-to-end connection and the second aggregated end-to-end connection cannot use the same established end-to-end connection.

FIG. 5 is an illustrative block diagram of a communications router, such as communications router 106, according to one of the embodiments of the present invention. Communications router 106 comprises processing unit 502, main memory 503, system bus 504, secondary storage 505, and plurality of network interfaces 506. Processing unit 502 and main memory 503 are connected to each other directly. System bus 504 connects processing unit 502 directly or indirectly to secondary storage 505, and plurality of network interfaces 506. Using system bus 504 allows communications router 106 to have increased modularity. System bus 504 couples processing unit 502 to secondary storage 505, and plurality of network interfaces 506. System bus 504 can be any of several types of bus structures including a memory bus, a peripheral bus, and a local bus using any of a variety of bus architectures. Secondary storage 505 stores program instructions for execution by processing unit 502. Secondary storage 505 further stores conditions, wherein classification of established end-to-end connections into different groups depends on whether or not the established end-to-end connections satisfy the conditions.

FIG. 4 is a tree-diagram illustrating how established end-to-end connections are classified into groups according to one of the embodiments. Established end-to-end connections 400 represents all established end-to-end connections between two network nodes, such as communications routers 106 and 108. Established end-to-end connections that satisfy conditions to be in a first group are classified into the first group of established end-to-end connections 410. The established end-to-end connections that do not satisfy conditions to be classified into first group of established end-to-end connections 410 are classified to non-first group of established end-to-end connections 420. In one variant, non-first group of established end-to-end connections 420 is further classified into second group of established end-to-end connections 421 and non-first/second established end-to-end connections 422. The established end-to-end connections that do not satisfy conditions to be classified to second group of established end-to-end connections 421 are classified to non-first/second established end-to-end connections 422. In one variant, non-first group of established end-to-end connections is not further classified into second group of established end-to-end connections 421 and non-first/second group of established end-to-end connections 422. Therefore second group of established end-to-end connections 421 is omitted.

In order to classify established end-to-end connections into different groups, a communications router determines if the established end-to-end connections satisfy certain conditions. According to one of the embodiments, the classification is performed in order to transmit certain types of packets through established end-to-end connections belonging to a certain group, and to transmit other types of packets using established end-to-end connections in other groups. According to one of the embodiments, once the classification is done, the groups are ranked so that data packets with highest priority are transmitted using a group of established end-to-end connections with highest rank.

In one of the embodiments of the present invention, when there are a plurality of established end-to-end connections in the first group of established end-to-end connections, data packets are distributed among and transmitted through the plurality of established end-to-end connections the first group using load balancing technology, or any other technology that allows data packets to be distributed and transmitted among multiple established end-to-end connections. It is known to those skilled in the arts that there are many techniques to transmit data packets using multiple established end-to-end connections. The same techniques can be applied to distribute data packets in other groups of established end-to-end connections as well.

FIG. 1B illustrates system 100 adapted according to embodiments configured to optimize the throughput of bonded multiple variable bandwidth connections by adjusting a tunnel bandwidth weighting schema during a data transfer session. System 100 includes multiple sites 102 and 104, which each comprise at least one communications router 106 and 108. Communications routers 106 and 108 may be embodied as multi WAN routers which support aggregating the bandwidth of multiple Internet connections. Communications routers 106 and 108 are connected over network 110. Network 110 may comprise a local area network (LAN), metropolitan area network (MAN), wide area network (WAN), wireless network, the public switched telephone network (PSTN), the Internet, an intranet, an extranet, etc.

Site 102 and router 106 may comprise M connections 112, and site 104 and router 108 may comprise N connections 114. Connections 112 and 114 are data connections for communicating information within network 110 between sites 102 and 104. In the illustrated embodiment, M is equal to 3 and N is equal to 2; however, these values may vary according to desired routers and configurations. Connections 112 and 114 may have similar or differing bandwidth capabilities. Further, connections 112 and 114 may comprise different types of WAN connections, such as a WiFi, cable, DSL, T1, 3G, 4G, satellite connections, and the like. It is also noted that site 102 and site 104 may be thought of as both a sender or receiver, and discussions regarding the functionality of either site may be implemented on the other site. In other words, system 100 may be implemented as a symmetrical network.

FIG. 2A shows a high level flow diagram of operation of system 100 depicting a method 200 for increasing throughput of a bonded connection. It should be appreciated that the particular functionality, the order of the functionality, etc. provided in FIG. 2A is intended to be exemplary of operation in accordance with the concepts of the present invention. Accordingly, the concepts herein may be implemented in various ways differing from that of the illustrated embodiment.

At block 201 of the illustrated embodiment when establishing a bonded connection between routers 102 and 104, such as by implementing a bonded site-to-site VPN connection, M×N virtual tunnels 116 may be created. Virtual tunnels 116 correspond to a unique permutation of the network connections of site 102 and the network connections of site 104.

Aggregated end-to-end connection 103 is equivalent to M×N virtual tunnels 116 as routers 106 and 108 aggregate M×N virtual tunnels 116 to form one aggregated end-to-end connection 103. M×N virtual tunnels 116 are classified into groups 103A, 103B and 103C.

At block 202 of the illustrated embodiment, default weights for the tunnels are determined and/or assigned. To determine default weights embodiments exchange uplink and downlink bandwidth data of connections 112 and 114 between sites 102 and 104. Using this bandwidth data, a default weight may be calculated according to the following: suppose site 102's downlink bandwidths of connections 1 to m are $d_1, d_2, \ldots d_m$, and site 104's uplink bandwidths of connections 1 to n are $u_1, u_2, \ldots u_n$; the default weight for the tunnel between site 102's connection X and site 104's connection Y may be defined as DW(x,y), where $DW(x,y) = d_x \cdot u_y$.

Using the above method to calculate default weight, if connections 112-1 through 112-3 are WAN connections of a multi WAN router with respective uplink/downlink bandwidths of 10 M/6 M, 8 M/4 M, and 6 M/6 M, and connections 114-1 through 114-2 are WAN connections of a multi WAN router with respective uplink/downlink bandwidths of 7 M/5 M and 9 M/3 M, the respective default weights for each tunnel will be as follows:

| For site 102 | For site 104 |
| --- | --- |
| DW(1, 1) = 6 * 7 = 42 | DW(1, 1) = 5 * 10 = 50 |
| DW(1, 2) = 6 * 9 = 54 | DW(1, 2) = 5 * 8 = 40 |
| DW(2, 1) = 4 * 7 = 28 | DW(1, 3) = 5 * 6 = 30 |
| DW(2, 2) = 4 * 9 = 36 | DW(2, 1) = 3 * 10 = 30 |
| DW(3, 1) = 6 * 7 = 42 | DW(2, 2) = 3 * 8 = 24 |
| DW(3, 2) = 6 * 9 = 54 | DW(2, 3) = 3 * 6 = 18 |

It is noted that other ways to calculate default weight are contemplated, and the above is simply an example of the implementation of an embodiment of the present invention. It is noted that many different weighting schema may be used to define the initial bandwidth of a tunnel. For example, one may desire to only weight a tunnel in one direction using the downlink capacity of a receiving site and the uplink capacity of the sending site. Any weighting scheme used to characterize capacity of the tunnels at the establishment of the bonded connection may be used for the purposes of the present invention.

When packets are being routed from site 102 to site 104 according to embodiments, the packets will be distributed to the tunnels in a ratio according to an effective weight, EW(x, y). Initially the effective weight of embodiments is set to be equal to the default weight, EW(x,y)=DW(x,y), and if the bandwidth of tunnels 116 remains unchanged from the initial setting, the effective weight is optimal for packet distribution. However, if a user is downloading a file over a bonded network connection in a TCP session with one or more tunnels having packet drops, the overall throughput of the session will drop dramatically. This is in part because the packet drops will keep causing TCP retransmissions and TCP's flow control will maintain a lower throughput even though tunnels without packet drops are not fully occupied.

One effective way to increase throughput would be to avoid such packet drops. To do so, embodiments of the present invention discern when tunnels are experiencing an increase or decrease in packet drop rates at block 203 of the illustrated embodiment. Embodiments further function to modify the effective weight of tunnels which are experiencing or have experienced changes in packet drop rates at block 204. The packet drop rate information may be monitored continuously or be monitored based on specific time periods. Once it is determined that a tunnel is experiencing an unacceptable rate of packet drops (block 204-1), the illustrated embodiment decreases the effective weight of the tunnel at block 204-2. In some embodiments, unacceptable may mean that the packet drop rate is a non-zero quantity, while other embodiments may determine that an unacceptable rate is any rate beyond a predefined threshold. Embodiments implement these decreases in stepwise fashion, in a continuous manner, in a reduction at one time in proportion to the increase in the packet drop rate, etc. When reductions are done in a gradual manner, embodiments may continue to monitor the tunnel in order to optimize the amount of reduction which is implemented.

Tunnels 116 may be established or monitored by sending heartbeat packets through each tunnel from either router 106 or router 108. In some embodiments when the receive end fails to receive heartbeat packets from a tunnel for a period of time, it will treat that tunnel as down and the tunnel will not be used for routing traffic. If heartbeat packets again start being received, the tunnel may be re-established and be weighted along with the other tunnels. As such, in the event that all packets are being dropped in a tunnel and the effective weight of that tunnel is reduced to zero, embodiments may utilize heartbeat packets to monitor and reestablish a connection.

Moreover, when tunnels recover all or part of their respective bandwidths, e.g. it is determined that the packet drop rate decreases (block 204-3), the illustrated embodiment functions to increase the effective weight of such tunnels (block 204-4) in order to fully, or more fully, utilize the bandwidth. Some embodiments increase the effective weight for a tunnel using predetermined step sizes until an accurate effective weight is regained. Other embodiments increase the effective weight proportionate to a newly measured bandwidth which may correspond to a newly measured packet drop rate. Moreover, embodiments may increase the effective weight for a tunnel based on a predetermined linear or exponential scale.

After the effective weight of the tunnels are adjusted, or it is determined that no adjustment is needed, the weighting scheme of the system is updated at block 205 of the illustrated embodiment. This update may comprise storing any processed information, using such information in further processing, causing the system to take no action, etc. For example, processing performed with respect to block 205 may operate to average weighting schemes over a period of time, such as to mitigate error associated with highly transient anomalies. Further, the updated information may be used on system 100 to modify the packet distribution of the data transfer session, as discussed with respect to FIG. 2B. System 100 may continue to implement steps 203-205 continuously or periodically throughout a data transfer session.

FIG. 2B illustrates an embodiment where, after weighting method 200 is implemented, the packets are distributed based, at least in part, on the modified weight of the tunnels. Specifically, block 206 of the illustrated embodiment operates to distribute packets across the tunnels in accordance with the weighting scheme determined by operation of method 200. In some embodiments, this distribution will change throughout a data transfer session, and therefore the steps of FIG. 2B are shown as repeating. Some embodiments change the packet distribution each time the system is updated at block 205. Moreover, block 205 may cause changes to be implemented periodically, in response to certain drop rate change thresholds, etc. It should be appreciated that the determination of weighting by operation of method 200 and the application of determined weighting to packet distribution at block 206 may have different periodicity. For example, method 200 may operate to provide updates of weighting scheme information using a relatively short iterative cycle while the distribution of packets is altered based upon such weighting scheme information using a longer iterative cycle.

To monitor the bandwidth of the various tunnels 116, some embodiments of the present invention encapsulate each transmitted IP packet with various information. FIG. 3 illustrates an example embodiment showing the type of information 300 which may be encapsulated in a transmitted IP packet. Version field 302 may contain information about the protocol version being utilized and protocol type field 303 may contain the protocol type of the payload packet. In general, the value of this field will correspond to the Ethernet protocol type for the packet. However, additional values may be defined in other documents. Tunnel ID field 304 may be a 32-bit field and may contain an identifier to identify the current tunnel of the IP packet. Advanced Encryption Standard (AES) initialization vector field 306 may be a 32-bit field and may contain an initialization vector for AES encryption. Global sequence number field 308 may be a 32-bit field and may contain a sequence number which is utilized to re-sequence each of the packets for various sessions into the proper order when they have emerged from their respective tunnels. Per tunnel sequence number field 310 may be a 32-bit field which may represent a sequence number that is assigned to each packet routed to a particular tunnel. AES encrypted payload field 312 may be utilized to convey the payload of the IP packet.

The per tunnel sequence number discussed above may be used to monitor dropped packets in a tunnel. In one embodiment the router on the receiving end calculates the packet drop rate of each tunnel, $DR(x,y)$, every f seconds by monitoring the per tunnel sequence number of the received packets. $DR(x,y)$ may be characterized as the sequence numbers missed divided by a sequence number increase for a period f. The length of period f may vary, and in one embodiment f is equal to 5 seconds.

Other methods may also be used to monitor dropped packets, e.g.: the sender may periodically inform the receive end how many packets it has sent, the sender sends a heartbeat packet to the receive end every constant period of time and the receive end can estimate the overall drop rate by monitoring the heartbeat packets drop rate, by acquiring drop rate figures from physical interface/device/layer, etc.

The receive end may feedback a particular tunnel's drop rate, effective weight, or other bandwidth indicators, to the sending router. When the sender receives information regarding packet drops, some embodiments lower the effective weight $EW(x,y)$ of a tunnel by $EW(x,y) \cdot DR(x,y)$. Other metrics may be used to modify the effective weight of a tunnel. In some embodiments, the sender may receive feedback and the effective weight may be reduced by number that is greater than or less than the packet drop rate. Such variances may be configured according to the particular needs of a communication system. The above example represents a metric that attempts to lower the effective weight of the tunnel to a weight which prevents further packet drops while maximizing the amount of usable bandwidth of the tunnel. Any metric which finds this balance may be preferred.

FIG. 6A is a flowchart illustrating a process used to classify an established end-to-end connection into one of the groups according to one of the embodiments of the present invention. FIG. 6A is viewed in conjunction with FIG. 5 for better understanding of the embodiment. In step 601, processing unit 502 retrieves conditions from secondary storage 505. The classification is based on whether or not the established end-to-end connection satisfies the conditions retrieved.

In step 602, processing unit 502 determines whether or not an established end-to-end connection between communications router 106 and communications router 108 satisfies the conditions.

If, in step 602, processing unit 502 determines that an established end-to-end connection satisfies all conditions, then the established end-to-end connection belongs to a first group of established end-to-end connections in step 603.

If, in step 602, processing unit 502 determines that an established end-to-end connection satisfies at least one conditions, but not all conditions, then the established end-to-end connection belongs to a second group of established end-to-end connections in step 604.

If, in step 602, processing unit 502 determines that an established end-to-end connection satisfies one or more specific conditions, but not all conditions, then the established end-to-end connection belongs to a second group of established end-to-end connections in step 604.

In one variant, if, in step 602, processing unit 502 determines that an established end-to-end connection does not satisfy any condition(s), then the established end-to-end connection belongs to non-first/second group of established end-to-end connections in step 605. Established end-to-end connections that belong to the non-first/second group do not belong to the first group or the second group of established end-to-end connections.

In one variant, there is no second group of established end-to-end connections, and step 604 is omitted. If, in step 602, processing unit 502 determines that an established end-to-end connection does not satisfy all conditions, then the established end-to-end connection belongs to the non-first/second group in step 605.

In one variant, there is only one condition retrieved from secondary storage 505 in step 601. If, in step 602, processing unit 502 determines that an established end-to-end connection satisfies the condition, then the established end-to-end connection belongs to a first group of established end-to-end connections in step 603. If, in step 602, processing unit 502 determines that the established end-to-end connection does not satisfy the condition, then the established end-to-end connection belongs to the non-first/second group of established end-to-end connections in step 605. Step 604 is omitted because there is only one condition.

When conditions are related to performance metrics, determination in step 602 is performed by sending testing data to communications router 108 using the established end-to-end connection. The contents of testing data can be based on, at least in part, contents of data packets, randomly generated contents, or one or more benchmarks testing. The time period to send testing data is preferred to be less than ten seconds as the number of testing data sent in ten seconds should be enough to determine the performance, such as round-trip-time, latency and packet drops in most networks.

Alternatively, instead of using testing data determination in step 602 is done by sending data packets, error correction/detection packets, management packets or health-check packets. Health-check packets are sent for maintenance of the established end-to-end connection and in order to check the status of the established end-to-end connection. When data packets are transmitted via each established end-to-end connection for the determination in step 602, after the classification is completed, the data packets are only transmitted via specific group(s) of established end-to-end connections. In one of the embodiments, a performance report is received from communications router 108, and the performance report is used to determine whether the established end-to-end connection satisfies conditions related to performance. Testing data can be transmitted through a plurality of established end-to-end connections sequentially, one-by-one, in a group, simultaneously, or almost simultaneously. In one variant, determination in step 602 is based, at least in part, on information or analysis of information stored in secondary storage 505. Alternatively, determination in step 602 is done by using historical data or historical performance data. The historical data is stored in secondary storage 505. An example of a scenario where historical data can be used to determine whether an established end-to-end connection satisfies a condition in step 602 is when the condition is based on a usage metric. For example, an established end-to-end connection satisfies a condition if its usage has not reached a certain limit, and does not satisfy the condition if its usage has reached or is close to the certain limit. Therefore the usage needs to be monitored and usage data is stored as historical data in secondary storage 505.

In one variant, testing data is sent using OSI layer two packets with Point-to-point Protocol (PPP), frame relay protocol, Address Resolution Protocol (ARP), or any other data link layer protocol. Alternatively, testing data is sent using Internet Protocol (IP) packets with transmission control protocol (TCP), user datagram protocol (UDP), or Internet Control Message Protocol (ICMP). If the established end-to-end connection uses LTE protocol, testing data is sent using Type 1 or Type 2 LTE frames. Alternatively, testing data is sent using Ethernet frames. Alternatively, the format of the testing data is based on, in part, the conditions that are retrieved and the communication protocol of the established end-to-end connection.

In one of the embodiments, a score is calculated for the established end-to-end connection based on the conditions it satisfies. The established end-to-end connection must satisfy a minimum number of conditions in order to belong to a group of established end-to-end connection. The minimum number can be predefined by a user, manufacturer or administrator of communications router 106. For example, there are five conditions and the minimum number of conditions that need to be satisfied by the established end-to-end connection to belong to the first group of established end-to-end connections is three. If processing unit 502 determines that the established end-to-end connection satisfies at least three conditions, the established end-to-end connection belongs to the first group of established end-to-end connection. If processing unit 502 determines that the established end-to-end connection does not satisfy at least three conditions, the established end-to-end connection belongs to a non-first group of established end-to-end connections. In one variant, the minimum number of conditions that need to be satisfied by the established end-to-end connection to belong to a second group of established end-to-end connections is two. If processing unit 502 determines that the established end-to-end connection does not satisfy at least three conditions, but the established end-to-end connection satisfies at least two conditions, the established end-to-end connection belongs to the second group of established end-to-end connections. There are myriad of techniques of applying combinations of conditions that require to be satisfied for an established end-to-end connection to belong to a certain group. The combinations can be configured by the user, manufacturer or network administrator of communications router 106 according to their preferences. It is beneficial for the user to be able to configure different combinations of conditions, as established end-to-end connections of different characteristics may be required in different situations.

Alternatively, weights are assigned to the conditions in order to calculate a score of the established end-to-end connection. The classification of the established end-to-end connection into a group is done according to the score. For example, there are three conditions, namely, a first condition, a second condition and a third condition. The weights assigned to the first, second and third conditions are fifty, thirty and twenty respectively. If the established end-to-end connection satisfies the first condition only, its score is fifty. If the established end-to-end connection satisfies the second condition only, its score is thirty. If the established end-to-end connection satisfies the third condition only, its score is twenty. If the established end-to-end connection satisfies the first condition and second condition, its score is eighty. If the established end-to-end connection satisfies the first condition and the third condition, its score is seventy. If the established end-to-end connection satisfies the second condition and the third condition, its score is fifty. If the established end-to-end connection satisfies all three conditions, its score is hundred. A minimum score required to belong to the first group of established end-to-end connection is fifty. Therefore, if processing unit 502 determines that the score of the established end-to-end connection is at least fifty according to the weights, the established end-to-end connection belongs to the first group of established end-to-end connections. The weights are used in order to emphasize on certain conditions.

In one variant, multiple minimum scores are configured for classifying the established end-to-end connections into multiple groups, wherein the scores of the established end-to-end connections are calculated according to weights of conditions they satisfy. Each group is assigned with a corresponding minimum score, wherein an established end-to-end connection must have a score more than or equal to the corresponding minimum score assigned to a group in order to belong to the group. For example, a first group, a second group, a third group, and a fourth group are assigned to corresponding minimum scores of seventy, sixty, fifty, and forty respectively. If an established end-to-end connection has a score of seventy or above, it belongs to the first group. Similarly, if an established end-to-end connection has a score between sixty to seventy, fifty to sixty, or forty to fifty, it belongs to the second group, third group, or fourth group respectively.

When some specific conditions are more important to be satisfied than other conditions, a user can assign higher weights to the specific conditions. Conditions that are more important are given higher priority by assigning higher weights to the conditions, while the other conditions that are less important are not completely disregarded.

In one variant, when there is a plurality of established end-to-end connections, and classification is being conducted for one of the established end-to-end connection, communications router 106 does not use other established end-to-end connections to transmit data. This can reduce interference of other established end-to-end connections and hence the classification is conducted more accurately and effectively. Alternatively, when classification is being conducted for one of the established end-to-end connection, communications router 106 continues using other established end-to-end connections to transmit data packets. Therefore transmission of data packets is not stopped until classification is completed, and hence communications router 106 is always active in transmitting data packets. This is beneficial because this ensures that there's no halt in transmission of data packets every time classification is conducted.

In one variant, after an established end-to-end connection is classified, it is reclassified periodically or upon a particular event occurs. An established end-to-end connection from one group can be classified to another group if the established end-to-end connections has become satisfying more or fewer conditions. This allows communications router 106 to select suitable established end-to-end connections when network environment changes. This is particularly more important for established end-to-end connections that are carried by wireless technologies as change of physical environment may also change network performance. Particularly, the time period to determine whether an established end-to-end connection has to be moved to another group or can stay in the group is in the range of two seconds to two minutes. The time period for established end-to-end connections using wired connection, is preferred to be longer than the time period for established end-to-end connections using wireless connection because established end-to-end connections using wireless connection usually experience more variations. The more frequent the reclassification is performed, the earlier communications router 106 is able to move an established end-to-end connection from one group to another group upon detecting change of satisfying condition(s). The less frequent the reclassification is performed, the less amount of testing packets need to be transmitted.

For illustration, an established end-to-end connection in the second group can belong to the first group when it satisfies conditions for belonging to the first group. Similarly, an established end-to-end connection in the first group is removed from the first group when it fails or stops satisfying conditions for belonging to the first group. Then if the established end-to-end connection satisfies conditions for belonging to the second group, the established end-to-end connection goes from the first group to the second group of established end-to-end connections. If the established end-to-end connection does not satisfy conditions for belonging to the second group, the established end-to-end connection goes from the first group to the non-first/second group of established end-to-end connections. Similarly, an established end-to-end connection in the non-first/second group becomes belonging to the first group when it satisfies conditions to belong to the first group. Similarly, an established end-to-end connection in the non-first/second group becomes belonging to the second group when it satisfies conditions for belonging to the second group but does not satisfy conditions for belonging to the first group. Similarly, an established end-to-end connection in the second group becomes belonging to the non-first/second group if it fails or stops satisfying conditions required for belonging to the second group. Therefore, the established end-to-end connections belonging to the second group or non-first/second group are performing the backup or failover functions.

FIG. 6B illustrates a process of classifying established end-to-end connections into multiple groups based on multiple conditions according to one of the embodiments, wherein the multiple conditions are all based on the same metric. For example, the multiple conditions are based on packet latency, which is a performance metric. The multiple conditions are retrieved by processing unit 502 from secondary storage 505. For better illustration, the multiple conditions include a first condition, a second condition, a third condition, a fourth condition, and a fifth condition. The first, second, third, fourth, and fifth conditions can be satisfied if packet latency is less than 10 ms, 20 ms, 30 ms, 40 ms, and 50 ms respectively. The multiple groups include a first group, a second group, a third group, a fourth group and an unsatisfactory group. In step 611, processing unit 502 determines whether an established end-to-end connection satisfies the fifth condition, more particularly, whether the packet latency is less than 50 ms. If the established end-to-end connection does not satisfy the fifth condition, more particularly, if the packet latency is not less than 50 ms, the established end-to-end connection belongs to the unsatisfactory group in step 621. If the established end-to-end connection satisfies the fifth condition, more particularly, if the packet latency is less than 50 ms, in step 612, processing unit 502 determines whether the established end-to-end connection satisfies the fourth condition, more particularly, whether the packet latency Is less than 40 ms. If the established end-to-end connection does not satisfy the fourth condition, more particularly, if the packet latency is not less than 40 ms, the established end-to-end connection belongs to the fifth group in step 622. If the established end-to-end connection satisfies the fourth condition, more particularly, if the packet latency is less than 40 ms, in step 613, processing unit 502 determines whether the established end-to-end connection satisfies the third condition, more particularly, whether the packet latency is less than 30 ms. If the established end-to-end connection does not satisfy the third condition, more particularly, if the packet latency is not less than 30 ms, the established end-to-end connection belongs to the fourth group in step 623. If the established end-to-end connection satisfies the third condition, more particularly, if the packet latency is less than 30 ms, in step 614, processing unit 502 determines whether the established end-to-end connection satisfies the second condition, more particularly, whether the packet latency is less than 20 ms. If the established end-to-end connection does not satisfy the second condition, more particularly, if the packet latency is not less than 20 ms, the established end-to-end connection belongs to the third group in step 624. If the established end-to-end connection satisfies the second condition, more particularly, if the packet latency is less than 20 ms, in step 615, processing unit 502 determines whether the established end-to-end connection satisfies the first condition, more particularly, whether the packet latency is less than 10 ms. If the established end-to-end connection does not satisfy the first condition, more particularly, if the packet latency is not less than 10 ms, the established end-to-end connection belongs to the second group in step 625. If the established end-to-end connection satisfies the first condition, more particularly, if the packet latency is less than 10 ms, the established end-to-end connection belongs to the first group in step 626.

Alternatively, the process of FIG. 6B can be implemented using multiple conditions that are based on something other than packet latency, such as other performance metrics, usage price, IP address range, or any other metric that can be used to implement multiple thresholds.

The steps of FIG. 6B may be conducted sequentially, simultaneously, or almost simultaneously. The order of the steps can be different than the order illustrated in FIG. 6B.

FIG. 6C illustrates a process of classifying established end-to-end connections into multiple groups based on multiple conditions according to one of the embodiments. The multiple conditions are stored in secondary storage 505. For illustration purpose, the multiple conditions include a first condition, a second condition, a third condition, a fourth condition and a fifth condition. A plurality of established end-to-end connections is classified into multiple groups in step 630. If processing unit 502 determines that an established end-to-end connection satisfies the first condition, the established end-to-end connection belongs to first group 631. If processing unit 502 determines that an established end-to-end connection satisfies the second condition, the established end-to-end connection belongs to second group 632. If processing unit 502 determines that an established end-to-end connection satisfies the third condition, the established end-to-end connection belongs to third group 633. If processing unit 502 determines that an established end-to-end connection satisfies the fourth condition, the established end-to-end connection belongs to fourth group 634. If processing unit 502 determines that an established end-to-end connection satisfies the fifth condition, the established end-to-end connection belongs to fifth group 635.

In one variant, the multiple conditions are based on multiple metrics, criteria, and/or parameters. For example, the first condition is based on location, the second condition is based on time, the third condition is based on a user identity, the fourth condition is based on security, and the fifth condition is based on communication protocol. An established end-to-end connection may belong to more than one group if it satisfies more than one condition. Alternatively, the multiple conditions are based on the same metric, criterion or parameter, but multiple threshold values. For example, the multiple conditions are based on throughput, which is a performance metric. The first condition is satisfied if throughput value of the established end-to-end connection is within a first range. Similarly, the second, third, fourth or fifth conditions are satisfied if the throughput value of the established end-to-end connection is within a second, third, fourth and fifth range respectively. More particularly, the first, second, third, fourth and fifth ranges are all different. In another alternative, the process of FIG. 6C can be implemented using multiple conditions that are based on something other than throughput, such as other performance metrics, usage price, IP address range, or any other metric, criterion or parameter that can be used to implement multiple numeric thresholds.

In one of the embodiments, established end-to-end connections are classified into multiple groups based on combinations of conditions that are satisfied by the established end-to-end connections. For example, established end-to-end connections satisfying a first and second condition belong to one group. Established end-to-end connections satisfying the first, second and third conditions belong to another group. Similarly, end-to-end connections satisfying other combinations of conditions belong to other groups. Having multiple groups of established end-to-end connections can be beneficial when packets of specific data types need to be transmitted using specific established end-to-end connections satisfying specific combinations of conditions, wherein the specific data types of the packets can be detected using myriad techniques for packet inspection, including deep packet inspection.

In one of the embodiments, an established end-to-end connection is classified into a certain group based on conditions not satisfied by the established end-to-end connection. For example, a condition is based on user identity which specifies a first user. When a user of an established end-to-end connection is determined to not be the first user, the established end-to-end connection belongs to a first group. When a user of an established end-to-end connection is determined to be the first user, the established end-to-end connection does not belong to the first group.

In one of the embodiments, after a plurality of established end-to-end connections are classified into groups by communications router 106, established end-to-end connections not being used to transmit data packets are maintained and not disconnected. In some communication protocols, if an established end-to-end connection is not used to transmit packets for a certain period of time, the established end-to-end connection is disconnected. In order to avoid this, maintenance packets, health check packets or management packets are transmitted through the established end-to-end connections in order to maintain the established end-to-end connection and keep the established end-to-end connection established. This ensures that the established end-to-end connection is available for use whenever it needs to be used to transmit data packets by the communications router without experiencing slowness.

Description of Conditions:

In one of the embodiments, classification of established end-to-end connections into different groups is based on whether the established end-to-end connections satisfy certain conditions. The conditions are selected from a group consisting of performance metric, service provider, location, time, usage price, security, user identity, Internet Protocol (IP) address range, communication protocol, communication technology, application, and device. The performance metric can be based on one or more of throughput, error rates, packet latency, packet jitter, symbol jitter, quality of service, bandwidth, bit error rate, packet error rate, frame error rate, dropped packet rate, queuing delay, round trip time, capacity, signal level, interference level, bandwidth delay product, handoff delay time, signal-to-interface ratio, and signal-to-noise ratio.

Service Provider:

In one of the embodiments, a condition is based on, at least in part, the service provider of the established end-to-end connection. For example, service provider A provides more reliable service than service provider B. Then, a condition can be such that an established end-to-end connection can satisfy the condition if it is from service provider A. The user can have a preference of service provider A over other service providers due to reliability, costs, or performance.

Usage Metric:

In one of the embodiments, a condition is based on, at least in part, the usage metric which specifies a usage limit for the established end-to-end connection. For example, an established end-to-end connection satisfies the condition if its usage has not reached the usage limit, and does not satisfy the condition if its usage has reached or is close to the usage limit. Most service providers charge a low price per Gigabyte as long as the usage is below a certain threshold, and when the usage goes above the certain threshold, the price per Gigabyte increases. Therefore, by making the usage limit equal to the certain threshold, cost of using the established end-to-end connection is kept within a budget.

Location:

In one of the embodiments, a condition is based on, at least in part, the location. For example, when communications router 106 is in a certain location, using some established end-to-end connections may be more preferable than other established end-to-end connections. The more preferable end-to-end connections satisfy the condition. It is beneficial to have a condition based on the location because some established end-to-end connections can be more preferable in certain locations mainly due to higher signal strengths of the established end-to-end connections in the certain locations. In another example, when communications router 106 is in a certain location using a first established end-to-end connection using LTE protocol, and a second established end-to-end connection using Wi-Fi connection becomes available in the certain location, communications router 106 can switch from the first established end-to-end connection to the second established end-to-end connection and perform network offloading based on the location. Therefore, in the certain location, the first established end-to-end connection does not satisfy the condition and the second established end-to-end connection satisfies the condition.

Time:

In one of the embodiments, a condition is based on, at least in part, the time. For example, at a certain time in the day, some established end-to-end connections may be more preferable than other established end-to-end connections. The more preferable end-to-end connections satisfy the conditions. This embodiment makes use of differences in cost, performance and reliability of established end-to-end connections during peak and off-peak hours.

Usage Price:

In one of the embodiments, a condition is based on, at least in part, the usage price. If the price of using an established end-to-end connection is more than a user's price limit, the established end-to-end connection does not satisfy the condition. If the price of using the established end-to-end connection is equal to or less than the user's price limit, the established end-to-end connection satisfies the condition. Setting a price limit is beneficial for users having a cost budget for using established end-to-end connections. For example, the user's price limit is $10 per Gigabyte. Therefore, if the price of using an established end-to-end connection is more than $10 per Gigabyte, the established end-to-end connection does not satisfy the condition, and if the price of using the established end-to-end connection is less than or equal to $10 per Gigabyte, the established end-to-end connection satisfies the condition.

Security:

In one of the embodiments, a condition is based on, at least in part, the security. If an established end-to-end connection is not secure enough, or the security protocol used in the established end-to-end connection is not a security protocol preferred by the user, the established end-to-end connection does not satisfy the condition. Having a secure established end-to-end connection is extremely important in order to achieve authenticity, integrity and confidentiality of data packets transmitted through the established end-to-end connection. Integrity of the data packets can maintain and assure the accuracy and consistency of information provided in the data packets. Confidentiality of the data packets is also required in order to prevent disclosure of information provided in the data packets to unauthorized individuals or systems. For example, the condition is that an established end-to-end connection has to use the encryption standard AES 192. If an established end-to-end connection uses AES 128 encryption, or any encryption standard other than AES 192, the established end-to-end connection does not satisfy the condition. If the established end-to-end connection uses AES 192 encryption, the established end-to-end connection satisfies the condition. Alternatively, the established end-to-end connection also satisfies the condition if the encryption standard used by the established end-to-end connection provides higher security measures than AES 192, such as AES 256.

User Identity:

In one of the embodiments, a condition is based on, at least in part, the user identity. For example, user authentication is required to access the established end-to-end connection. According to the identity of users, certain established end-to-end connections may be reserved for certain users. If the established end-to-end connection is reserved for the user using communications router 106, then the established end-to-end connection satisfies the condition. It is beneficial to have a condition based on the user identity in a communications router that has more than one user, wherein each user may have different preferences for using established end-to-end connections.

IP Address Range:

In one of the embodiments, a condition is based on, at least in part, the IP address range. For example, a range of IP addresses is specified in the condition, such that, if an established end-to-end connection is between communications router 106 and a network interface whose IP address does not belong to the range of IP addresses, the established end-to-end connection does not satisfy the condition. If the established end-to-end connection is between communications router 106 and a network interface whose IP address belongs to the range of IP addresses, the established end-to-end connection satisfies the condition.

Communication Protocol:

In one of the embodiments, a condition is based on, at least in part, the communication protocol. Communication protocols include PPP, frame relay protocol, ARP and IP such as TCP, UDP or ICMP. For example, a user wants to use established end-to-end connections to transmit a certain type of data packet with a specific communication protocol. If an established end-to-end connection uses the specific communication protocol, then the established end-to-end connection satisfies the condition. If the established end-to-end connection does not use the specific communication protocol, then the established end-to-end connection does not satisfy the condition. For example, the user wants to use an established end-to-end connection for transmitting PPP data packets. If the established end-to-end connection uses PPP, the established end-to-end connection satisfies the condition. If the established end-to-end connection does not use PPP, the established end-to-end connection does not satisfy the condition.

Communication Technology:

In one of the embodiments, a condition is based on, at least in part, the communication technology. Communication technologies include wireless technologies, Wi-Fi, WiMax, High-Speed Packet Access technology, 3GPP Long Term Evolution (LTE) or the like. For example, a user wants to use established end-to-end connections to transmit a certain type of data packet with a specific communication technology. If an established end-to-end connection uses the specific communication technology, then the established end-to-end connection satisfies the condition. If the established end-to-end connection does not use the specific communication technology, then the established end-to-end connection does not satisfy the condition. For illustration purposes, the user wants to use an established end-to-end connection to transmit data packets with 3GPP LTE technology. Therefore, if an established end-to-end connection uses 3GPP LTE, the established end-to-end connection satisfies the condition. It is beneficial to have a condition based on the communication technology because of the varying features of different communication technologies, wherein some specific features of certain communication technologies can be required to fulfill the purpose of using an established end-to-end connection.

Application:

In one of the embodiments, a condition is based on, at least in part, the application. For example, the user wants to use established end-to-end connections to transmit data packets to a certain application. If an established end-to-end connection is suitable for being used in the certain application, the established end-to-end connection satisfies the condition. Alternatively, when an established end-to-end connection is known to be suitable for a certain application, the established end-to-end connection satisfies the condition only if the user wants to use the established end-to-end connection for transmitting data packets to the certain application.

Device:

In one of the embodiments, a condition is based on, at least in part, the device. For example, the user wants to use established end-to-end connections formed between network interfaces that use a specific type of modem of a specific model number. If an established end-to-end connection is formed between network interfaces using the specific type of modem of the specific model number, then the established end-to-end connection satisfies the condition. This can be beneficial in cases where the performance or usage price or reliability of the specific type of modem of the specific model number is better and more suitable for transmitting the type of data packet that the user wants to transmit through the established end-to-end connection. For example, the user wants to use established end-to-end connections that are established with a Verizon Wireless 4G LTE USB Modem 551L. If the established end-to-end connection connects communications router 106 to a Verizon Wireless 4G LTE USB Modem 551L, then the established end-to-end connection satisfies the condition. In another example, the user wants to use established end-to-end connections using a Subscriber Identity Module (SIM) card subscribed to a specific service provider or with a specific service plan. If an established end-to-end connection uses a SIM card from the specific service provider or with the specific service plan, the established end-to-end connection satisfies the condition. This can be beneficial in terms of costs and reliability associated with the SIM card.

Ranking of the Groups:

In one of the embodiments of the present invention, when established end-to-end connections are classified into different groups, such as first group, second group and non-first/second group, ranks are assigned to the different groups in order to prioritize transmitting packets using established end-to-end connections in groups with higher ranks. This prioritization is important so that the established end-to-end connections with the higher ranks and the best characteristics according to the user's preferences are used to send data packets. Other types of packets, such as management packets, error correction packets, and all non-data packets are transmitted using established end-to-end connections with lower ranks. Therefore, established end-to-end connections with higher ranks are reserved for data packets, and their capacity is not filled by other types of packets. Alternatively, established end-to-end connections with higher ranks are also be used to transmit other types of packets as some administrators may consider management packets and error correction packets should have the same or even higher priority than data packets. Established end-to-end connections belonging to a particular group have the same rank. In one variant, rank of the first group of established end-to-end connections is the highest. Rank of non-first group of established end-to-end connections is lower than rank of the first group of established end-to-end connections. If there is a second group of established end-to-end connections, rank of the second group of established end-to-end connection is the second-highest. Rank of the non-first/second group of established end-to-end connection is the lowest.

Alternatively, there are multiple groups of established end-to-end-connections, wherein the multiple groups of established end-to-end connections are created based on conditions satisfied or not satisfied by established end-to-end connections. FIG. 6B and FIG. 6C illustrate in detail how established end-to-end connections can be classified into multiple groups.

In one variant, communications router 106 transmits data packets to communications router 108 using only the first group of established end-to-end connections. When the capacity of the first group of established end-to-end connections is full, the data packets are transmitted later. Communications router 106 waits till the first group of established end-to-end connections has enough capacity, and then transmits the data packets to communications router 108 using the first group of established end-to-end connections. There can be various reasons for doing this. For example, the first group of established end-to-end connections is more reliable and faster than the second group or non-first/second group of established end-to-end connections. Therefore, the user may choose to always use the first group of established end-to-end connections to transmit data packets due to their reliability and speed.

Alternatively, communications router 106 transmits data packets to communications router 108 using only the first group of established end-to-end connections. When the capacity of the first group of established end-to-end connections is full, communications router 106 uses the non-first group of established end-to-end connections to transmit data packets to communications router 108.

Alternatively, communications router 106 transmits data packets to communications router 108 using only the first group of established end-to-end connections. When the capacity of the first group of established end-to-end connections is full, communications router 106 uses the second group of established end-to-end connections to transmit data packets to communications router 108. When the capacity of the second group of established end-to-end connections is also full, the data packets are not transmitted until capacity is available at the first group or the second group of established end-to-end connections. Communications router 106 waits till the first group or second group of established end-to-end connections has enough capacity, and then transmits the data packets to communications router 108 using the first group of established end-to-end connections. It should be noted that the second group of established end-to-end connections is only used when capacity of the first group of established end-to-end connections still full.

Alternatively, when the capacity of the first group of established end-to-end connections is full, communications router 106 uses the second group of established end-to-end connections to transmit data packets to communications router 108. When the capacity of the second group of established end-to-end connections is also full, communications router 106 uses the non-first/second group of established end-to-end connections to transmit the data packets to communications router 108. The non-first/second group of established end-to-end connections comprises the non-first group and non-second group of established end-to-end connections.

In one of the embodiments, established end-to-end connections in the second group are ranked according to the conditions satisfied by them. The first group of established end-to-end connections satisfies all conditions and the non-first/second group of established end-to-end connections do not satisfy any conditions. However, the second group of established end-to-end connections satisfies some conditions, but not all conditions. Therefore, the second group may comprise established end-to-end connections of many characteristics, wherein each established end-to-end connections may or may not satisfy the same conditions. Since the established end-to-end connections in the second group have different characteristics, it is beneficial to assign ranks to each established end-to-end connection so that packets can be transmitted using established end-to-end connections with higher ranks according to the user's preferences.

FIG. 7 illustrates rankings of multiple groups of established end-to-end connections at a communications router according to one of the embodiments. The rankings are stored in secondary storage 505 and are implemented by processing unit 502. Ranking table 700 lists multiple groups and their respective ranks. In one variant, ranking 720 is taken into consideration. According to ranking 720, first group 711, second group 712, third group 713, fourth group 714 and fifth group 715 are assigned with first rank, second rank, third rank, fourth rank and fifth rank respectively. Rankings can be configured by the user, or network administrator of the communications router. Hence in another variant, when ranking 730 is taken into consideration, first group 711, second group 712, third group 713, fourth group 714 and fifth group 715 are assigned with second rank, third rank, first rank, fourth rank, and fifth rank respectively. It would be appreciated by those skilled in the arts that assigning ranks to each group of established end-to-end connections is beneficial in order to prioritize transmitting packets using established end-to-end connections in groups with higher ranks. It would also be appreciated that different users may have different preferences when assigning ranks to groups, and hence for illustration purposes, two kinds of rankings, namely ranking 720 and ranking 730 are shown in ranking table 700.

Transmitting

According to one of the embodiments of the present invention, when an established end-to-end connection fails a condition specific to a data type, communications router 106 does not transmit data packets belonging to the data type through the established end-to-end connection but still transmits data packets not belonging to the data type through the established end-to-end connection. The established end-to-end connection that is used to transmit a certain type of data packets but not all types of data packets belongs to a second group of established end-to-end connection.

The use of second group of established end-to-end connections to transmit data packets may help improve data packet transmission performance as not all established end-to-end may have the same network performance. For example, some established end-to-end connections may have larger latency and some established end-to-end connections may have fewer packet drops. Depending on which conditions an established end-to-end connection meets, the established end-to-end connection may belong to a group of established end-to-end connections that are suitable for one kind of data packets but not suitable for another kind of data packets. For example the second group of established end-to-end connections with high-latency is suitable for data packets belonging to file transfer application, but not suitable for data packets belongs to voice communications.

According to one of the embodiments of the present invention, communications router 106 keeps monitoring if any of the second group of established end-to-end connections has become eligible to belong to the first group of established end-to-end connections by satisfying all conditions or has become eligible to belong to the non-first/second group of established end-to-end connections by failing to satisfy other conditions. Moving an established end-to-end connection from the second group of established end-to-end connection to the first group of established end-to-end connection may improve the overall network performance of the aggregated end-to-end connection because communications router 106 has more choices of established end-to-end connections in the first group to transmit data packets. Also, moving an established end-to-end connection from the second group of established end-to-end connection to the non-first/second group of established end-to-end connection may improve the overall network performance of the aggregated end-to-end connection because communications router 106 does not transmit data packets through established end-to-end connections in the non-first/second group to reduce data packet loss, data packet delay, data packet jitter and other undesired effect.

Although it is important that communications router 106 does not transmit data packets from communications router 106 to communications router 108 through the non-first/second group of established end-to-end connections for certain applications, the stringent requirement of not using the non-first/second group of established end-to-end connections can be relaxed by allowing communications router 106 to use the second group of established end-to-end connections for other applications in order to improve the data packet performance.

For applications using TCP for communication, data packets drop in one of the established end-to-end connections, of the aggregated end-to-end connection, belonging to the first group may negatively affect the overall throughput of the aggregated end-to-end connection. This is because data packets of one TCP session transmitted by communications router 106 to communications router 108 are being spread among the first group of established end-to-end connections. As a result, when an established end-to-end connection belonging to the first group becomes an established end-to-end connection belonging to the non-first/second group, communications router 106 should not transmit data packets through the established end-to-end connections belonging to the non-first/second group.

Packet Inspection

According to one of the embodiments, packets are distributed according to three categories, namely, data packets, management packets, and error correction packets. In one alternative, distribution of the packets is done by packet inspection where the content of the packets are inspected to determine whether they are data packets, management packets, or error correction packets. In another alternative, for packets that originate from communications router 106, for example management packets, packet inspection is not required to determine which category the packets belong to.

Data packets are packets that carry information that needs to be transmitted from a communications router 106 to a communications router 108 via at least one established end-to-end connection. Data packets may be originated from communications router 106 or may be originated from host(s) or node(s) connected to communications router 106. Destination of the data packets is communications router 108 host(s) and/or node(s) connected to communications router 108.

Management packets are packets that are created by communications router 106 and transmitted via established end-to-end connections in order to manage the aggregated end-to-end connection. Management packets include routing packets, switching packets, health-check packets, maintenance packets, performance report packets, and other types of packets required to manage aggregated end-to-end connections. Management information is used to assist communications router 106, including to manage the established end-to-end connections, to manage the aggregated end-to-end connections, to test the performance of an end-to-end connection and to communicate with communications router 108 to coordinately manage the established end-to-end connections. The management information can be piggybacked with data in one or more data packets or can be transmitted as one or more standalone data packets.

Error correction packets are packets that are transmitted by communications router 106 to correct or detect any errors in data packets that are transmitted from communications router 106 to communications router 108. Error correction packets include Forward error correction (FEC) packets or Automatic repeat request (ARQ) packets, Parity packets, or the like.

According to a preferred embodiment, the first group of established end-to-end connections is used to transmit data packets. The first group of established end-to-end connections has the highest rank amongst other established end-to-end connections. Therefore the first group of established end-to-end connections is most suitable for transmitting data packets according to the user's preferences. Management packets, error correction packets are transmitted using the second group of established end-to-end connections or the non-first/second group of established end-to-end connections. The benefit of transmitting management packets and error correction packets using the non-first group and/or the non-first/second group of established end-to-end connections is that the first group of established end-to-end connections is reserved for data packets and higher capacity is available for transmitting data packets. Furthermore, it is preferable to transmit error correction packets using different established end-to-end connections than the ones used for transmitting data packets so that the same errors are not found in the error correction packets.

In one of the embodiments, if capacity of the first group of established end-to-end connections is full, data packets are transmitted using the second group of established end-to-end connections. In one of the embodiments, if capacity of the first group and the second group of established end-to-end connections is full, data packets are transmitted using the non-first/second group of established end-to-end connections.

In one of the embodiments, if the first group of established end-to-end connections has enough capacity for transmitting non-data packets in addition to data packets, then management packets are transmitted using the first group of established end-to-end connections. In one of the embodiments, management packets for authentication of a user are transmitted using the first group of established end-to-end connections. For example, established end-to-end connections using File Transfer Protocol (FTP) require authentication of users, and therefore, the authentication information is transmitted using the first group of established end-to-end connections.

In one of the embodiments, data packets are distributed among established end-to-end connections within a group, and transmitted through the established end-to-end connections using techniques described in FIGS. 2A and 2B.

Failover

According to one of the embodiments of the present invention described in FIG. 8 and the classification illustrated in FIG. 4, when one or more established end-to-end connections belonging to the first group fails and other established end-to-end connections belonging to the first group does not have enough capacity to transmit data packets, communications router 106 uses one or more established end-to-end connections belonging to the second group to transmit the data packets. Therefore, the established end-to-end connections belonging to the second group are performing the backup or failover functions. There are many possibilities why the established end-to-end connection belonging to the first group does not have enough capacity. For example, the number of data packets is too large. In another example, an established end-to-end connection belonging to the first group fails by disconnection or equipment malfunctioning such that the established end-to-end connection breaks and cannot be classified to be in the first group anymore. Although the performance of the established end-to-end connection belonging to the second group may not be as good as those in the first group, the established end-to-end connection belonging to the second group can provide additional capacity for transmitting data packets.

According to one of the embodiments of the present invention, a first established end-to-end connection is the only established end-to-end connection belonging to the first group. Data packets are transmitted through the first established end-to-end connection in step 801. Data packets are continued to be transmitted through the first established end-to-end connection in step 801 if processing unit 502 determines that number of data packet drops or losses detected in the first established end-to-end connection within a first predefined time period is fewer than a first predefined number of data packet drops or losses in step 802. When processing unit 502 detects at least the first predefined number of data packet drops or losses in the first established end-to-end connection within the first predefined time period in step 802, communications router 106 transmits "warm-up" packets through a second established end-to-end connection, which belongs to the second group, in step 803. Data packets are continued to be transmitted through the first established end-to-end connection in step 801 if processing unit 502 determines that number of data packet drops or losses detected in the first established end-to-end connection within a second predefined time period is fewer than a second predefined number of data packet drops or losses in step 804. When processing unit 502 detects at least an additional second predefined number of data packet drops or losses in the first established end-to-end connection within the second predefined time period in step 804, communications router 106 starts transmitting data packets through the second established end-to-end connection in step 805. After a third predefined time period, communications router 106 tests the performance of the first established end-to-end connection to check if there is still at least a third predefined number of packet drops or losses within a fourth predefined time period in step 806. If the first established end-to-end does not experience at least the third predefined number of packet drops or losses within the fourth predefined time period, communications router 106 starts reusing the first established end-to-end connection to transmit data packets in step 807 and stops using the second established end-to-end connection to transmit data packets in step 808. If processing unit 502 detects at least the third predefined number of data packet drops or losses in the first established end-to-end connection within the fourth predefined time period in step 806, data packets are continued to be transmitted through the second established end-to-end connection in step 805. It is important to allow the third predefined time period to pass before conducting step 806 so that the switch between using the first established end-to-end connection and using the second established end-to-end connection is not too frequent as this may deteriorate the overall performance. In one variant, step 808 is omitted and communications router continues transmitting data packets, more particularly "warm-up" packets, through the second established end-to-end connection so that the second established end-to-end connection remains activated. The process of FIG. 8 is performed periodically.

The "warm-up" packets are used in step 803 to assist the second established end-to-end connection to be fully activated in time. As different access service providers deploy different mechanism to handle data packets from inactive connections, established end-to-end connections that use inactive connections may experience slowness when data packets start being transmitted through them. Also, different network adapter manufacturers may deploy different techniques in managing network interfaces that are inactive. For example, wireless modem, being used as a network interface or part of a network interface, may be switched into an energy-saving mode or sleep mode after a long period of receiving or transmitting no packet. In order to reduce the probability of slowness experienced by the data packets, communications router 106 transmits "warm-up" packets to make the connections become active. This is especially more important for wireless connections, such as connections using satellite, 3G, LTE and cellular technologies, that are used for establishing end-to-end connections. The "warm-up" packets may contain data or may be health-check packets. The size and frequency of sending the "warm-up" packets should be adjusted for different communication technologies and protocols that are used to establish the end-to-end connection.

Another purpose of transmitting the "warm-up" packets in step 803 is to test whether the second established end-to-end connection is still in operation and still belong to the second group. If the second established end-to-end connection is not in operation or should not remain in the second group, a third established end-to-end connection which belongs to the second group is selected and is tested with "warm-up" packets in step 803.

The first predefined number of data packet drops or losses, second predefined number of data packet drops or losses, and third predefined number of packet drops or losses are set by the manufacturer, administrator or user of communications router 106. These predefined numbers can be the same or different. In one preferred embodiment, the first predefined first number of data packet drops or losses is less than five, the second predefined first number of data packet drops or losses is less than ten and the second predefined first number of data packet drops or losses is less than five. The smaller a predefined number is, the performance requirement of the established end-to-end connection is more stringent because the number of packets allowed to be dropped or lost is smaller.

The first predefined time period, the second predefined time period, the third predefined time period and the fourth predefined time period are set by the manufacturer, administrator or user of communications router 106. These predefined time periods can be the same or different. The longer the first predefined time period, the second predefined time period, and the fourth predefined time period are, the performance requirement of the established end-to-end connection is more stringent because the allowed packet dropping rate or packet losing rate is smaller.

According to one of the embodiments of the present invention and the classification illustrated in FIG. 4, communications router 106 transmits data packets through a first established end-to-end connection. When the probability of the first established end-to-end connection not being able to remain in the first group reaches a predefined threshold or the first established end-to-end connection is about to be removed from the first group, communications router 106 transmits "warm-up" packets through a second established end-to-end connection, which belongs to the second group. When the first established end-to-end connection no longer remains in the first group, communications router 106 starts transmitting data packets through the second established end-to-end connection. After a predefined time period, when the first established end-to-end connection is in the first group again, communications router 106 use the first established end-to-end connection to transmit data packets again and stop using the second established end-to-end connection to transmit data packets.

Communications router 106 determines the probability, of whether the first established end-to-end connection can remain in the first group, based on how close the conditions of the first group are to be violated. For example, the conditions of the first group are that average latency is below 50 ms, average packet loss rate is below one packet in two thousand packets, and no data transmission between five o'clock and six o'clock in the afternoon respectively. For illustration purpose, when the first established end-to-end connection experiences average latency of rises from 40 milliseconds to 48 milliseconds in ten seconds, the probability may raise to a very high value depending on the methodology to calculate the probability. In such case, communications router 106 transmits "warm-up" packets through the second established end-to-end connection as the first established end-to-end connection may be removed from the first group soon. Also for illustration purpose, when the time is four o'clock and fifty-eight minutes in the afternoon, communications router 106 transmits "warm-up" packets through the second established end-to-end connection to test whether the second established end-to-end connection still belongs to the second group. If the second established end-to-end connection still belongs to the second group, communications router 106 start transmitting data packet through the second established end-to-end connection when the time is just about at five o'clock in the afternoon because the first established end-to-end connection will fail the conditions of the first group at five o'clock in the afternoon.

According to one of the embodiments of the present invention, when the second established end-to-end connection no longer belongs to the second group and also does not belong to the first group, the second established end-to-end connection is either broken or is classified into non-first/second group. Therefore, communications router 106 transmits another set of "warm-up" packets through another one or more established end-to-end connections belonging to the second group to determine which established end-to-end connection can be used in case the first established end-to-end connection no longer remains in the first group. In case there are no more established end-to-end connections in belonging to the second group, communications router 106 transmits another set of "warm-up" packets through one or more established end-to-end connections belonging to the non-first/second group. As the second established end-to-end connection is determined to be broken or to be in non-first/second group, the window of time to determine to which established end-to-end connection can be used has shrank as it takes time for using "warm-up" packets to determine the quality and/or status of other established end-to-end connections.

The first group of established end-to-end connections can be determined by using the embodiments described above.

FIG. 9 is a flowchart illustrating a process according to one of the embodiments. An aggregated end-to-end connection is established in step 901. The aggregated end-to-end connection comprises a plurality of established end-to-end connections. The plurality of established end-to-end connections comprise a first established end-to-end connection classified into a first group of established end-to-end connections, and a second established end-to-end connection classified into a second group of established end-to-end connections. In step 902, processing unit 502 determines whether a first condition is satisfied. If the first condition is satisfied, data packets are transmitted through the first established end-to-end connection in step 905. If the first condition is not satisfied, in step 904, the first established end-to-end connection is not used to transmit data packets. In step 903, processing unit 502 determines whether a second condition is satisfied. If the second condition is satisfied, data packets are transmitted through the second established end-to-end connection in step 907. If the second condition is not satisfied, the second established end-to-end connection is not used to transmit data packets in step 906.

According to one of the embodiments of the present invention, the plurality of established end-to-end connections are classified into groups after step 901 and before determining whether the first and second conditions are satisfied. The classification is used to determine which established end-to-end connections should be grouped together. Therefore a condition can be applied to all established end-to-end connections belonging to the same group. Further, the same group of established end-to-end connections can be managed together.

In one variant, the first condition and the second condition are mutually exclusive. For example, the first condition is satisfied when the second condition is not satisfied, and the second condition is satisfied when the first condition is not satisfied. Therefore, data packets are transmitted either through the first established end-to-end connection in step 906 or through the second established end-to-end connection in step 907.

Alternatively, the first condition and the second condition are not related. It is possible that both first and second conditions are satisfied at the same time. When both the first condition and the second condition are satisfied, data packets are distributed among and transmitted through both the first and second established end-to-end connections.

Alternatively, the first condition and the second condition are related. Such that probability of satisfying a condition is affected by whether another condition is satisfied or not satisfied.

In one variant, when the first condition is satisfied in step 902, data packets are transmitted through all established end-to-end connections belonging to the first group in step 905 and when the first condition is not satisfied in step 902, data packets are not transmitted through any established end-to-end connections belonging to the first group in step 906. Similarly, when the second condition is satisfied in step 903, data packets are transmitted through all established end-to-end connections belonging to the second group in step 907, and when the second condition is not satisfied in step 903, data packets are not transmitted through any established end-to-end connections belonging to the second group in step 906.

In one variant, the first condition and second condition can be based on performance of certain established end-to-end connections while using the certain established end-to-end connections, service provider of certain established end-to-end connections, location of communications router 106, time of the day, usage price of certain established end-to-end connections, security protocols of certain established end-to-end connections, user identity, IP address range of destination of the aggregated end-to-end connection, communication protocol of certain established end-to-end connections, communication technology of certain established end-to-end connections, application using certain established end-to-end connections, and device using certain established end-to-end connections.

Failure of Network Interface

Network Interface with End-to-End Connection

According to one of the embodiments of the present invention and the classification illustrated in FIG. 4, communications router 106 has a plurality of network interfaces and some of the network interfaces are connected with connections. Communications router 106 establishes a first established end-to-end connection using a first network interface through a first connection. The first established end-to-end connection is classified into the first group by processing unit 502. Communications router 106 does not have other established end-to-end connections but have possible end-to-end connections that can be used through at least one non-first network interface. When processing unit 502 determines that the probability of the first established end-to-end connection not being able to remain in the first group has reached a predefined threshold, the first established end-to-end connection is about to be removed from the first group, or the network interface has reported at least one error that may cause the first established end-to-end connection to not remain in the first group, communications router 106 activates a second network interface and tries to establish a second end-to-end connection with communications router 108. If the second end-to-end connection can be established successfully and satisfy the condition(s) of the second group, processing unit 502 classifies the second end-to-end connection into the second group. If the second end-to-end connection cannot be established successfully and/or cannot satisfy the condition(s) of the second group, communications router 106 activates other non-first/second network interface(s) and processing unit 502 determines which network interface can establish an end-to-end connection that can satisfy the condition(s) of the second group.

Once there is an established end-to-end connection that can satisfy condition(s) of the second group, communications router 106 is ready to transmit data packet using the established end-to-end connection if the first established end-to-end connection no longer belongs to the first group. This embodiment does not require a second established end-to-end connection to be established in advance. Instead the second established end-to-end connection is established when the first, end-to-end connection has a high probability or about not to remain in the first group. This embodiment reduces the needs to send packets through non-first network interface(s) and result in fewer uses of connections that are connected to non-first network interface(s).

For those who are skilled in the art, they would appreciate that there myriad reasons why a network interface reports error, including connection failure, modem failure, operating system failure, drop in signal-to-noise ratio detected by a modem, and etc. When a network interface reports an error, it is likely that it may not be able to transmit and/or receive data packets and affects established end-to-end connection(s) going through it.

According to one of the embodiments of the present invention, as there is only one established end-to-end connection in this embodiment, there is no need to have an aggregated end-to-end connection to hold the established end-to-end connection as this reduces the size of payload available while providing no significant improvement. Furthermore, as there is only one network interface being used at one time, the condition(s) to determine whether the first established end-to-end connection being able to remain in the first group can also be applied to determine whether to use a non-first network interface to transmit all data packets, regardless whether destination of data packets is communications router 108 or not.

For example, a first network interface of communications router 106 is determined to be in a first group for transmitting and receiving data packets as it satisfies all conditions while a second network interface is determined to be in a second group. When the first network interface is about to be removed from the first group, communications router 106 starts sending "warm-up" packets through the second network interface in order to prepare the second network interface for transmitting data packets. When the first network interface is removed from the first group, the second network interface can start transmitting and receiving data packets. When the first network interface again belongs to the first group, communications router 106 will use the first network interface to transmit and receive data packets and stop using the second network interface to transmit and receive data packets. Classification of network interfaces into the first group and second group can be conducted in a similar manner as the classification of established end-to-end connections in different groups which is discussed in the embodiments described above.

When communications router 106 is not using the second network interface to transmit and receive data packets, communications router 106 can still use the second network interface to transmit error correction packets, management packets, health-check packets and testing packets.

Network Interface without End-to-End Connection

According to one of the embodiments of the present invention and classification is conducted on network interfaces of a communications device, instead of on end-to-end connections. The communications device can be a router, switch, multiplexer, host or node. This is illustrated in FIG. 11, which is viewed in conjunction with FIG. 5 for better understanding, wherein FIG. 5 illustrates a block diagram of the communications device. Data packets are ready to be transmitted by the communications device in step 1101. The communications device uses a first network interface to transmit the data packets in step 1105 when processing unit 502 determines that first condition is satisfied in step 1102. The communications device uses a second network interface to transmit data packets in step 1107 when processing unit 502 determines that second condition is satisfied in step 1103. In one variant, when processing unit determines that the first condition is not satisfied in step 1102, the communications device can still use the first network interface to transmit data packets; when the first condition is satisfied, the communications device must use the first network interface to transmit data packets. Similarly, when processing unit 502 determines that the second condition is not satisfied in step 1103, the communications device can still use the second network interface to transmit data packets; when the second condition is satisfied, the communications device must use the second network interface to transmit data packets. In one variant, when processing unit 502 determines that the first condition is not satisfied in step 1102, the communications device stops using the first network interface to transmit data packets in step 1104 and the same is also applied to the second condition and the second network interface in step 1106.

The first condition and the second condition can be independent, uncorrelated, dependent, or correlated. The first condition and the second condition are configured by the administrator, manufacturer or user of the communications device.

In the case that the communications device stops using the first network interface to transmit data packets in step 1104 if the first condition is not satisfied, the overall network performance of the communications device will be adversely affected if the first network interface is abruptly ceased to operate. Therefore, the communications device should stop using first network adapter to transmit data packets while not adversely overall network performance significantly. According to one of the embodiments of the present invention, the communications device will make a second network interface be ready to transmit and receive data packets when it is about to stop using the first network interface. Therefore, the communications device makes the second network interface ready when the first condition is about not to be satisfied. In case, the first condition is still satisfied after a predefined period of time or the probability that the first condition not being satisfied has reduced, the communications device does not try to keep second network interface active as keeping second network interface may increase power consumption and result in higher data usage.

The process of FIG. 11 is similar to the process of FIG. 9, and the only difference is that FIG. 9 illustrates a process for selecting established end-to-end connections for transmitting data packets, and FIG. 11 illustrates a process for selecting network interfaces for transmitting data packets.

The conditions described earlier to classify an end-to-end connection or a network interface, including performance metric, service provider, usage metric, location, time, usage price, security, user identity, Internet Protocol address range, communication protocol, communication technology and application can be used as conditions for network interfaces. For example, a first condition is based on a performance metric, such that if the first network interface or the network connection carried by the first network interface does not satisfy the first condition, the communications device does not use the first network interface further. In another example, the first condition is based on user identity that only authenticated users can use the first network interface. Therefore, the communications device does not use the first network interface to transmit data packets originated from a non-authenticate user.

According to one of the embodiments of the present invention, a third condition is used to begin the activation process of the second network interface. During the activation process, the communications device starts activating or "warming up" the second network interface. There are myriad ways to activate the second network interface. For example, the second network interface can be activated by supplying electricity to it. In another example, the second network interface is activated by transmitting packets to a communication network through it and the packets may encapsulate data, another packet, management information, randomly generated content or predefined content. The goal for activating the second network interface is to allow the second network interface to transmit data packets at the moment when the first condition is satisfied or when the first network interlace is ceased to transmit data packets.

The third condition should be more stringent than the second condition, otherwise a scenario will happen that the third condition is satisfied but the second condition has not been satisfied yet that could result in the second network interface may not be activated in time.

According to one of the embodiments of the present invention, when the communications device has determined that it can use the first network interface again to transmit data packets, the communications device will stop using the second network interface to transmit data packets and begin using the first network interface to transmit data packets. A fourth condition is used to evaluate whether the first network interlace can again be used to transmit data packets.

According to one of the embodiments of the present invention, conditions, including the first condition, the second condition, the third condition, and the fourth condition, can follow the conditions described in the earlier part of the this invention.

According to one of the embodiments of the present invention, when the communications device transmits data through one of the network interfaces, the communications device can use the same network interface or another network interface to receive data packets.

FIG. 10 is an illustration of a preferred embodiment according to the present invention. At step 1001, the communications device transmits data packets through a first network interface. At step 1002, processing unit 502 determines whether the first network interface satisfies a third condition, which is a third predefined number of data packet drops or loss within a third predefined time period. If the third condition is satisfied, the communications device starts activating the second network interface at step 1003. The third predefined number of data packet drops or loss is in the range of one packet to one hundred packets. The third predefined time period is in the range of one second to one minute. The larger the third predefined number of data packet drops or loss is, the more packet drops or loss is tolerated. On the other hand, the larger the third predefined time period is, the fewer packet drops or loss is tolerated. For illustrative purpose, the third predefined number of data packet loss is five packets and the third predefined time period is ten seconds. Therefore, the third condition is satisfied when there are six or more packet drops within five seconds.

At step 1004, processing unit 502 determines whether a second condition, which is a second predefined number of packet drops or losses within a second predefined period of time detected at the first network interface, is satisfied. If the second condition is satisfied, the communications device starts using the second network interface to transmit data packets at step 1005. In one variant, when the communications device uses the second network interface to transmit data packets, the communications device stops using the first network interface to transmit data packets. Therefore the second condition can be constructed based on the first condition that the second condition is opposite to the first condition. Such that when the first condition is satisfied, the second condition is not satisfied and when second condition is satisfied, the first condition is not satisfied. For illustrative purpose only, the second predefined number of packets loss is ten packets and the second predefined time period is ten seconds at the first network interface. Therefore, the second condition is satisfied when there have been already ten packet drops within less than ten seconds. The first condition should be configured to be fewer than the ten packet losses within ten seconds. As a result, when the communication device stops using the first network interface to transmit data packets, the second network interface can transmit data packets substantially at the same time.

At step 1006, processing unit 502 determines whether the first network interface should be used again to transmit data packets. If a fourth condition is satisfied, step 1007 and 1008 are performed to transmit data packets through the first network interface again and stop using the second network interface to transmit data packets. The fourth condition is a predefined number of packets loss within a fourth predefined period of time detected at the first network interface. For illustrative purpose only, the fourth predefined number of packets loss is five packets and the fourth predefined time period is ten seconds at the first network interface.

In one variant, the communications device should not perform step 1006 almost immediately after step 1005. This is because it is possible that the network connection of the first network interface has not stabilized. If step 1006 is performed when the network connection of the first network interface or the network interface is not stabilized, the communications device may toggle between using the first network interface and second network interface frequently. This may result in significant adverse impact on the performance.

In one variant, the fourth conditions should not be too relaxed comparing to the first condition. Otherwise, the communications device may also experience toggling between using and stopping to use the first network interface frequently. This may result in significant adverse impact on the performance as well.

The condition(s) are stored in secondary storage 505 and are retrieved by processing unit 502 from secondary storage 505 to determine whether a network interface satisfies the condition(s). The first network interface and the second network interface are two of the plurality of network interfaces 506.

According to one of the embodiments of the present invention, processing unit 502 determines whether a network interface satisfies a condition by determining whether an access link, a connection, a network or an end-to-end connection that the network interface associated with satisfies the condition. For example, if the condition is that network latency experienced by a network interface must be less than two milliseconds, then the condition is equivalent to network latency observed at an access link connected through the network interface is less than two milliseconds.

Alert Message

According to one of the embodiments of the present invention, when an established end-to-end connection leaves or joins a group, or when an established end-to-end connection stops satisfying a condition, at least one alert message is generated by communications router 106 and sent to a predefined destination. An alert message can be an email, an instant message, a short message service (SMS), a phone call, a message shown in a web page, a popup message at a web page, an alarm, a sound, a blinking light, a light-emitting diode (LED) being turned on and other indicators that can be used to indicating an event has occurred. A predefined destination can be an email address, an IP address, a LED, a speaker, a screen, a console, a network node, a host, a mobile phone, a laptop and any electronic device that can receive the alert message. For example, when a first established end-to-end connection at communications router 106 has left the first group, a SMS is sent to the administrator of communications router 106. In another example, when a first established end-to-end connection at communications router 106 has left the first group, at least two alert messages are generated by communications router 106. The at least two alert messages include a pop-up message generated on a webpage and an instant message sent to the user and/or administrator of communications router 106. In another example, when the first established end-to-end connection at communications router 106 has rejoined the first group, a LED light on communications router 106 will blink for a few second to indicate that the first established end-to-end connection has rejoined the first group.

Input of Conditions

The condition(s) can be entered into communications router 106 through console, a connection and/or a removable computer readable storage medium. In particular, a console is a serial console that a laptop, for example, is connected to communications router 106 through the serial console to enter, configure, manage and remove condition(s). A connection, in particular, is connected to communications router 106 through an Ethernet cable. One end of the Ethernet cable is connected to communications router 106 and the other end of the Ethernet cable is connected to a network node, which provides connection to other networks, including the Internet. Thus, for example, an administrator of communications router 106 is able to log on to communications router 106 to enter, configure, manage and remove conditions. Alternatively, the connection is a wireless connection implementing a wireless communication standard including LTE, WiFi, High Speed Downlink Packet Access (HSDPA) communication standard, Zigbee, UWB, 3G, WiMAX, Bluetooth and GPRS. A removable computer readable storage medium includes a Flash card, a subscriber identity module (SIM) card, a secure digital (SD) card or any removable computer readable storage medium that allows instructions being uploaded to communications router 106.

According to one of the embodiments of the present invention, when an administrator accesses communications router 106 through a connection, the administrator is presented with a web interface, command line interface and/or application programming interface (API). Therefore conditions can be inputted remotely or locally through the web interface, command line interface and/or API and can be stored in secondary storage 505.

BRIEF DESCRIPTION OF THE DRAWINGS

FIG. 1A illustrates a network environment according to one of the embodiments of the present invention.

FIG. 7 illustrates rankings of multiple groups of established end-to-end connections at a communications router according to one of the embodiments.

Figure 1B:
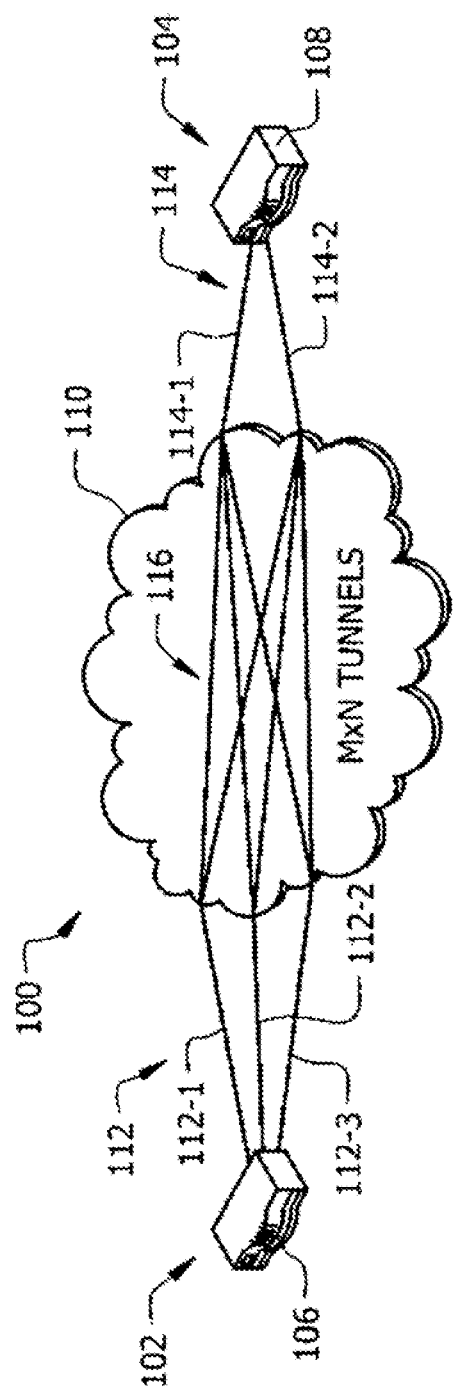
FIG. 1B illustrates a system adapted according to embodiments configured to optimize the throughput of bonded multiple variable bandwidth connections by adjusting a tunnel bandwidth weighting schema during a data transfer session.
Figure 2A:
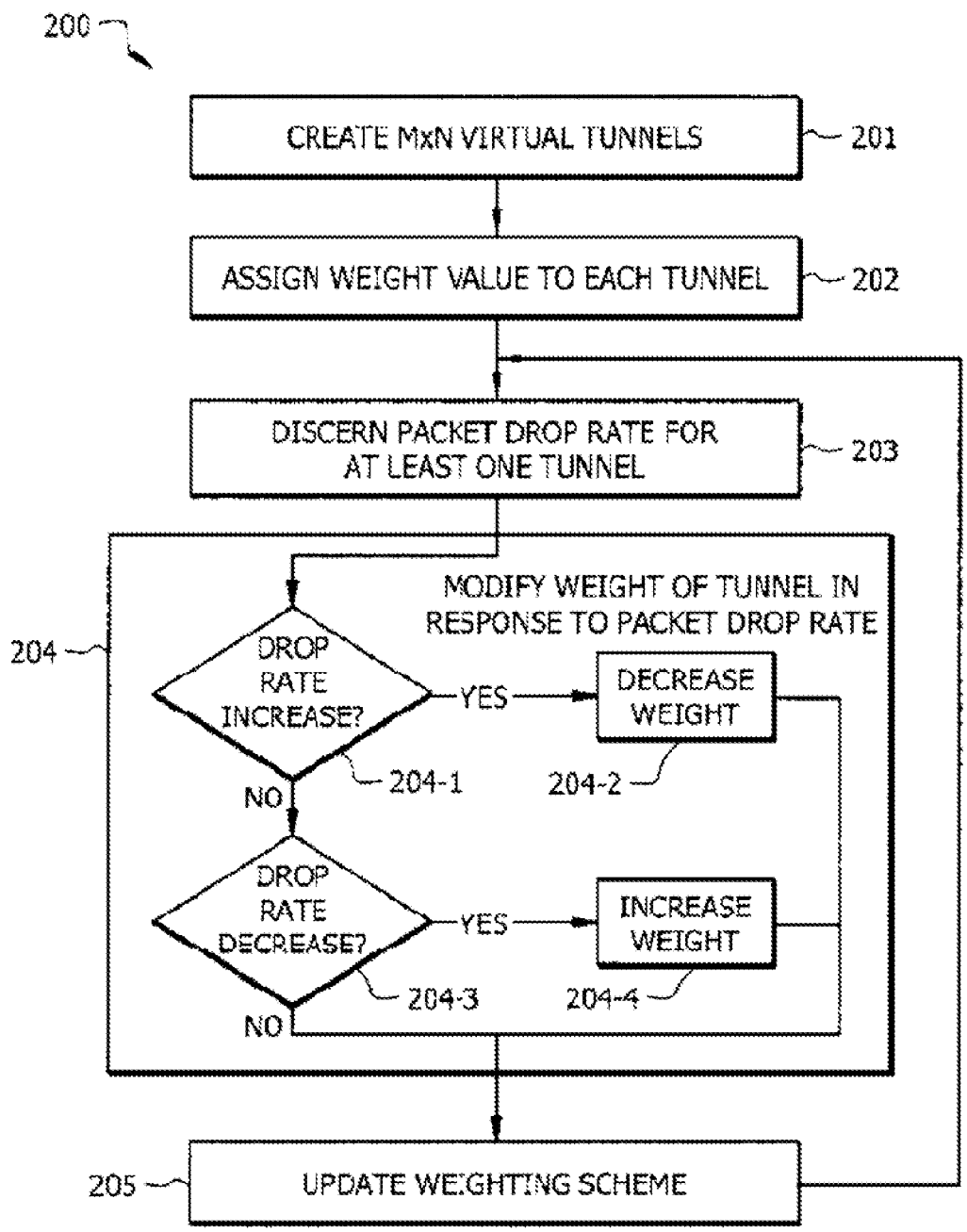
FIG. 2A shows a high level flow diagram of operation of a system depicting a method for increasing throughput of a bonded connection.
Figure 2B:
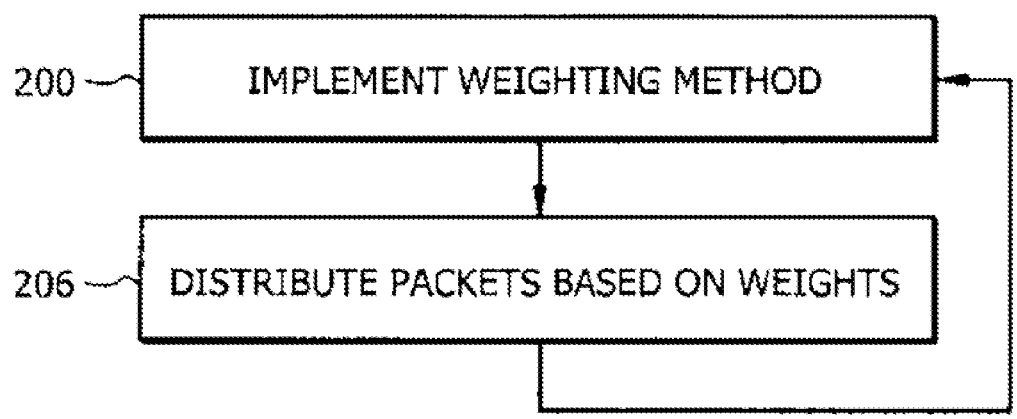
FIG. 2B illustrates an embodiment where, after a weighting method is implemented, the packets are distributed based, at least in part, on the modified weight of the tunnels.
Figure 3:
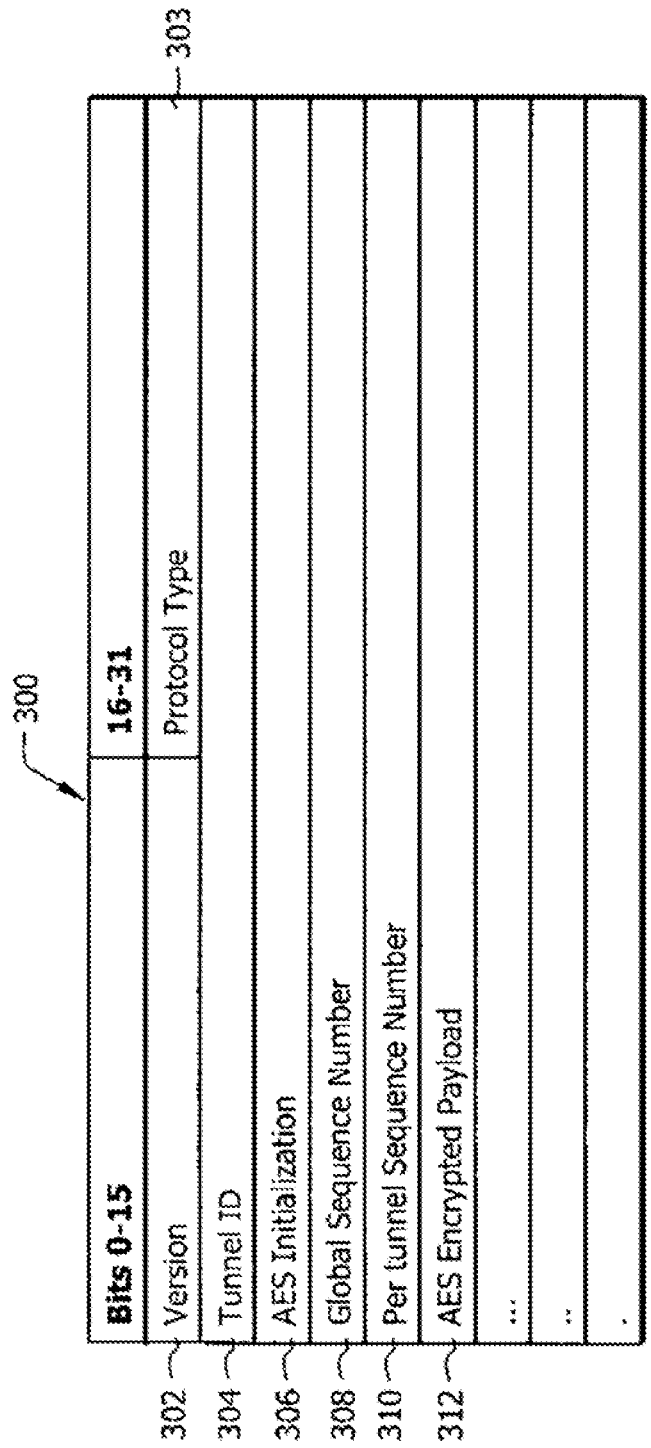
FIG. 3 illustrates the type of information which may be encapsulated in a transmitted IP packet according to one of the embodiments.
Figure 4:
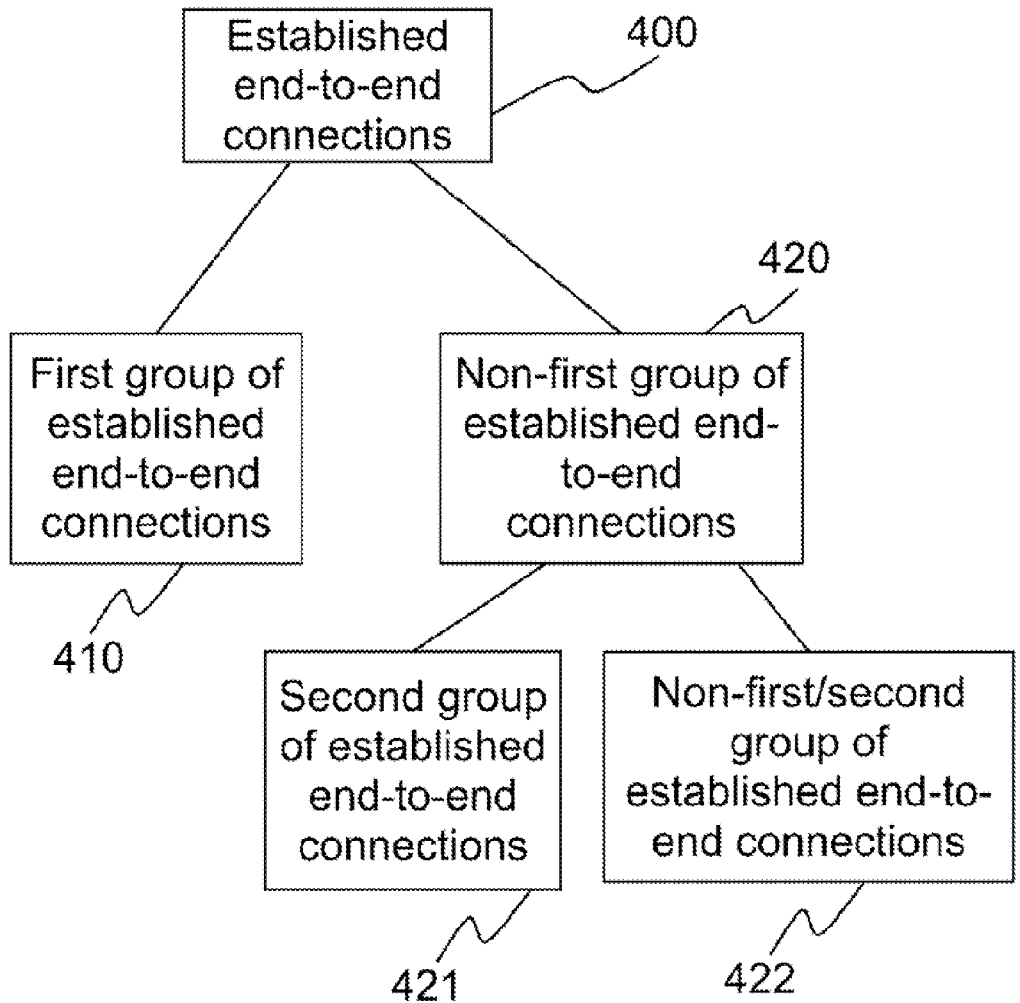
FIG. 4 is a tree-diagram illustrating how established end-to-end connections are classified into groups according to one of the embodiments.
Figure 5:
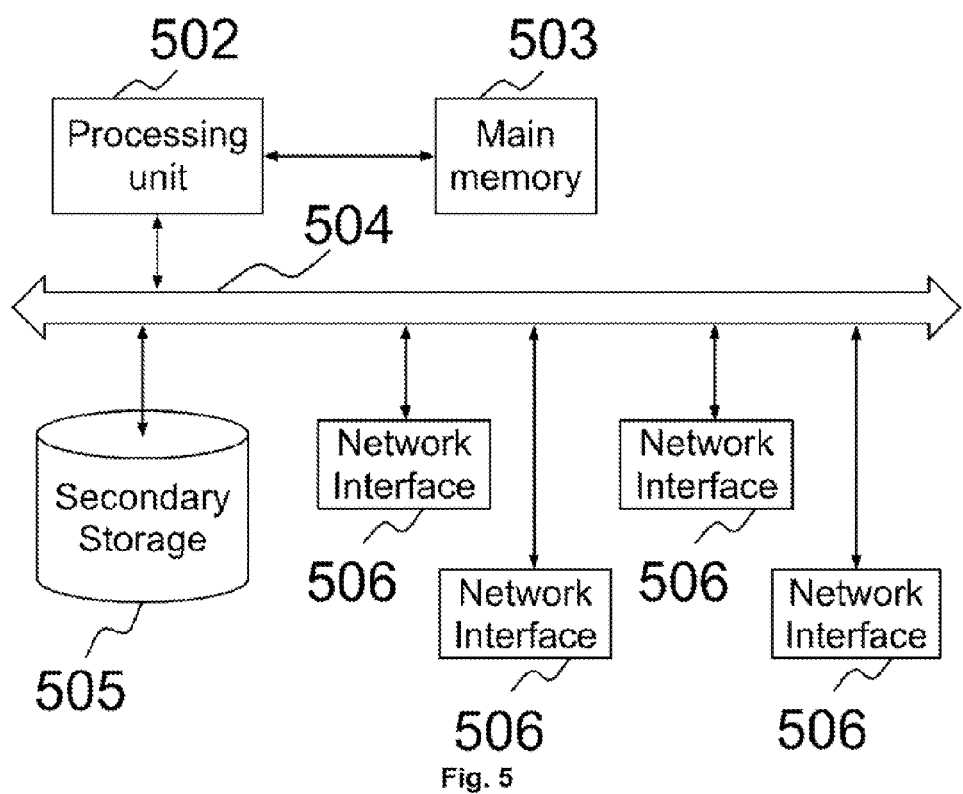
FIG. 5 is an illustrative block diagram of a communications router according to one of the embodiments.
Figure 6A:
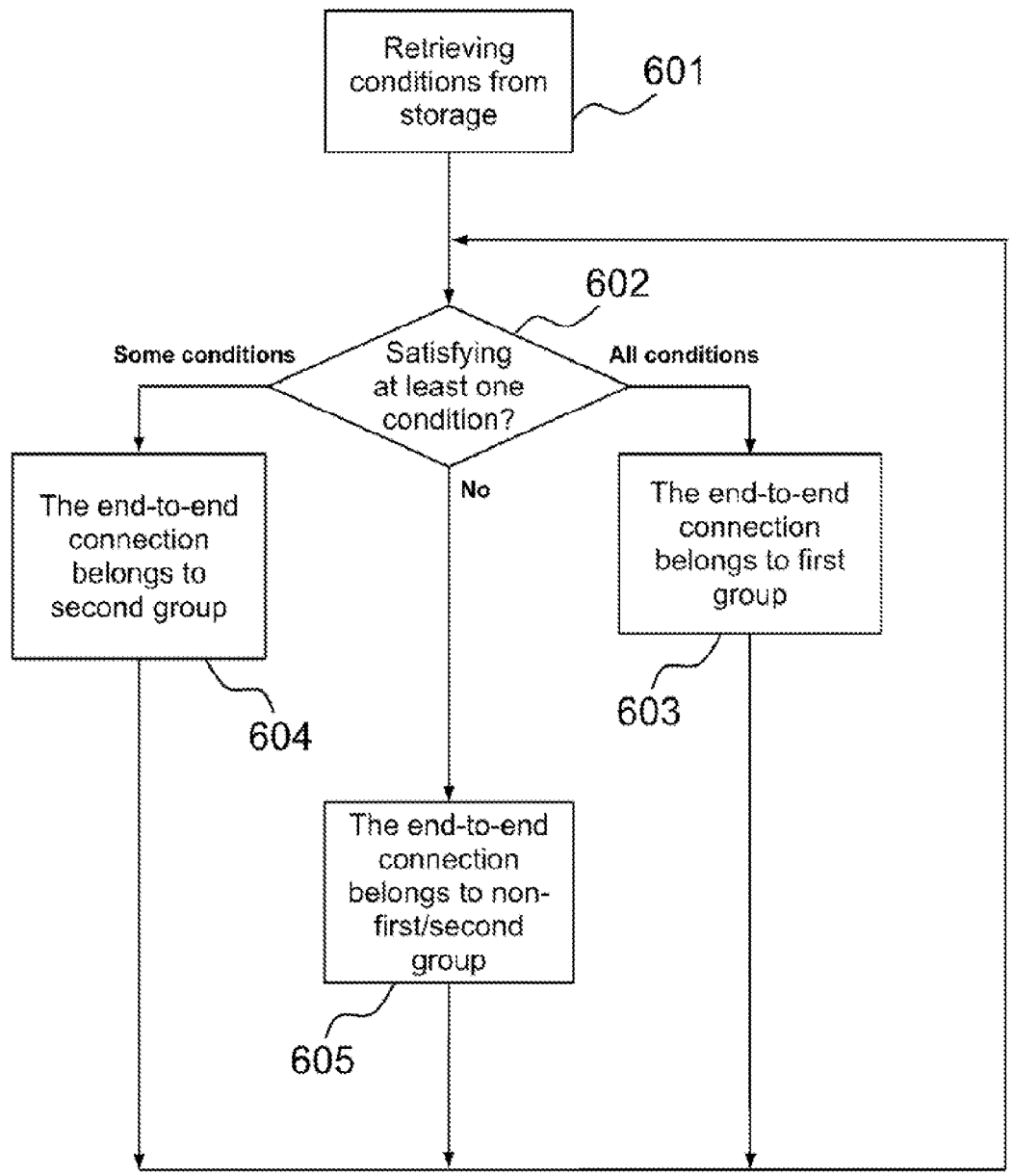
FIG. 6A is a flowchart illustrating a process used to classify an established end-to-end connection into one of the groups according to one of the embodiments.
Figure 6B:
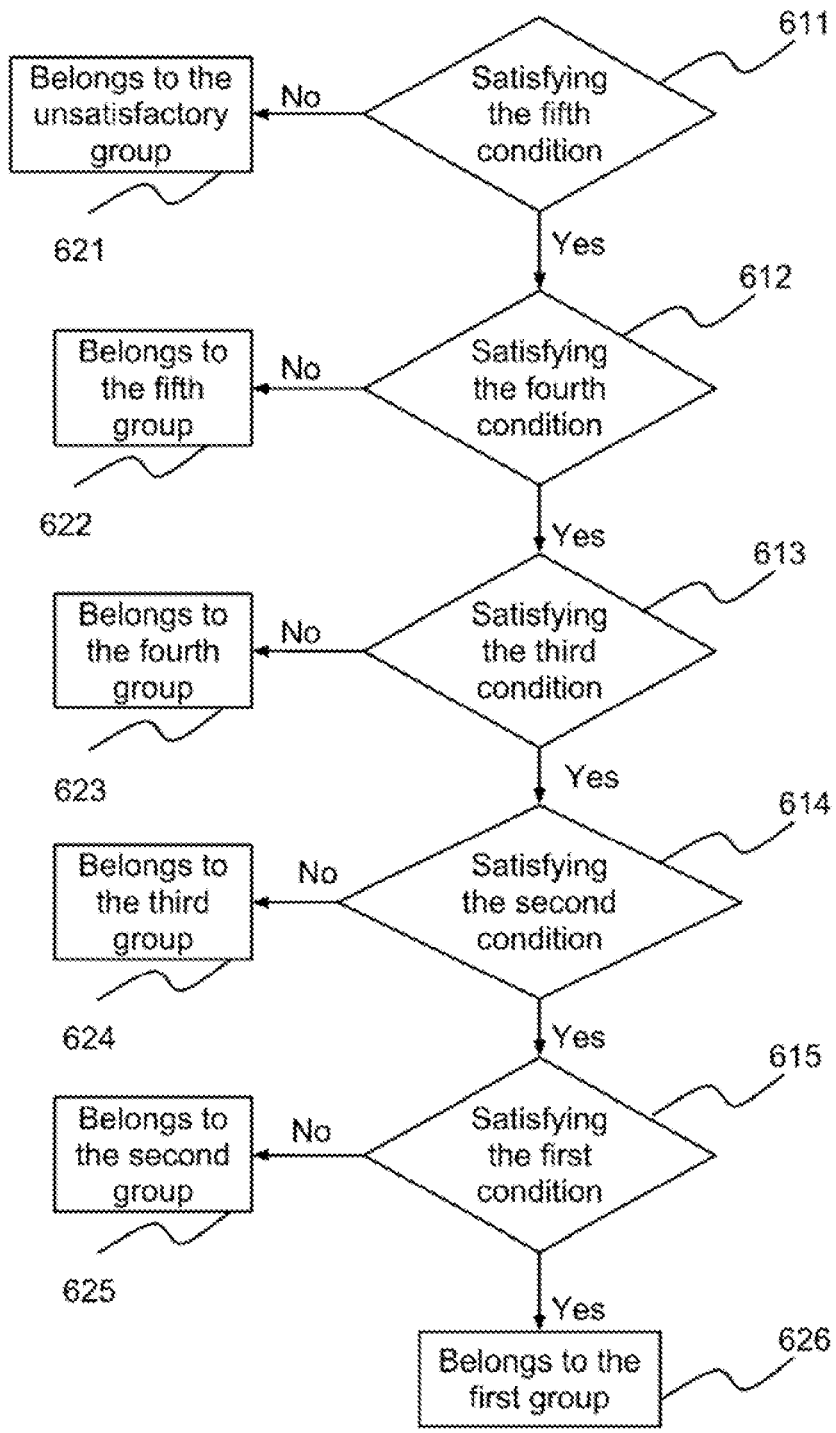
FIG. 6B illustrates a process of classifying established end-to-end connections into multiple groups based on multiple conditions according to one of the embodiments.
Figure 6C:
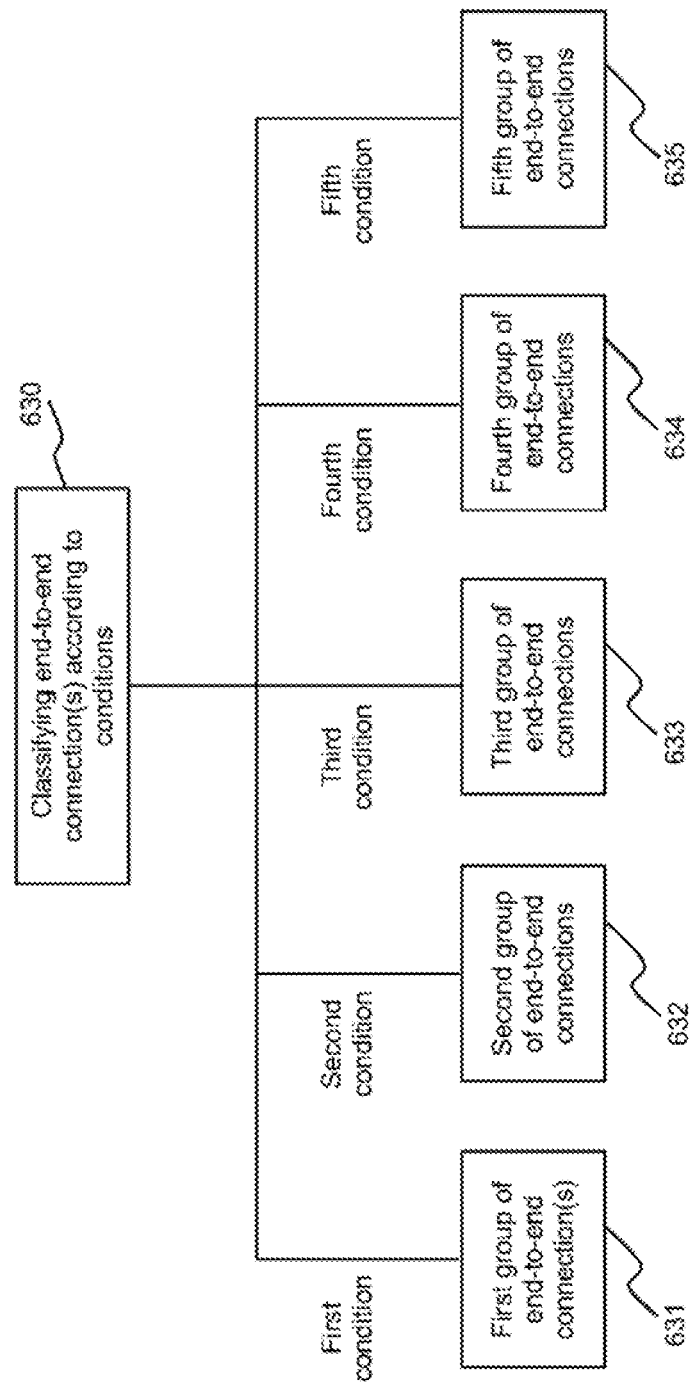
FIG. 6C illustrates a process of classifying established end-to-end connections into multiple groups based on multiple conditions according to one of the embodiments, wherein the multiple conditions are all based on the same metric.
Figure 8:
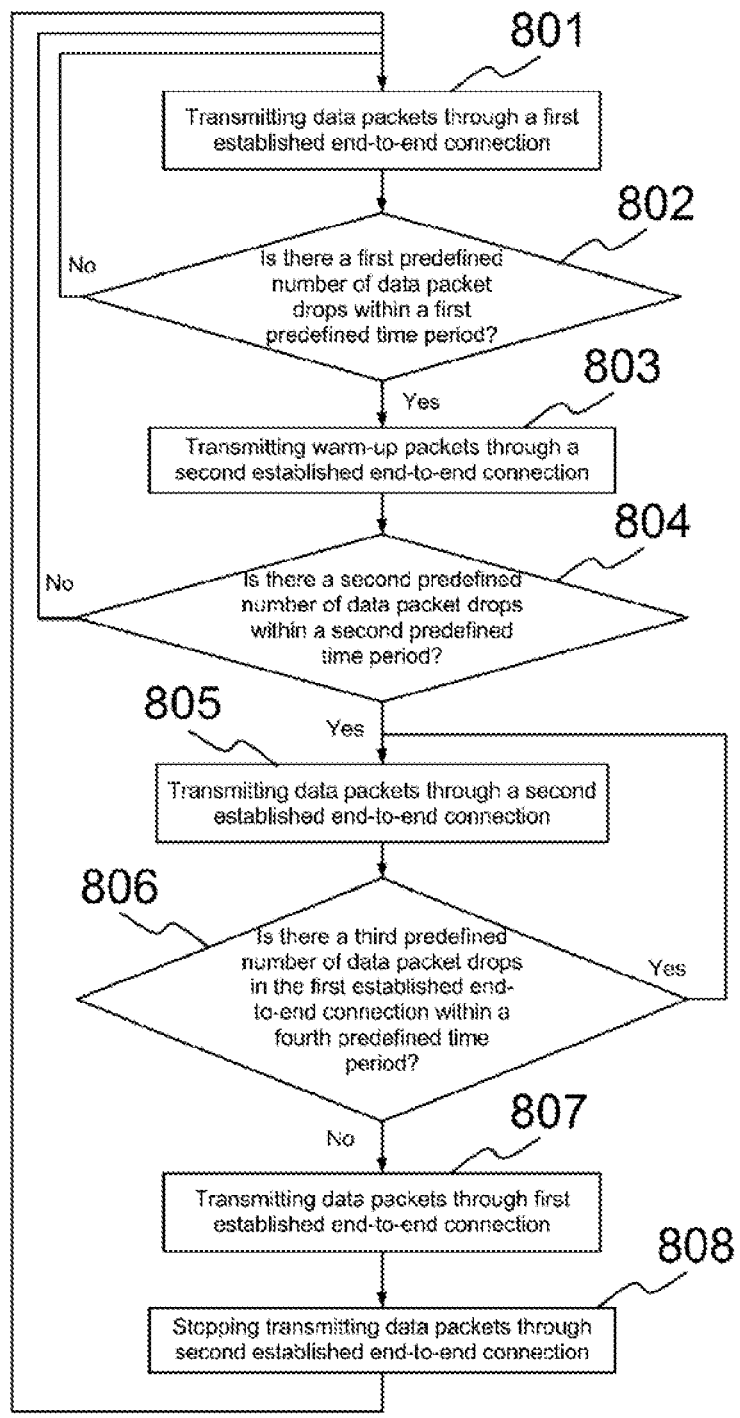
FIG. 8 is a flowchart illustrating a process according to one of the embodiments.
Figure 9:
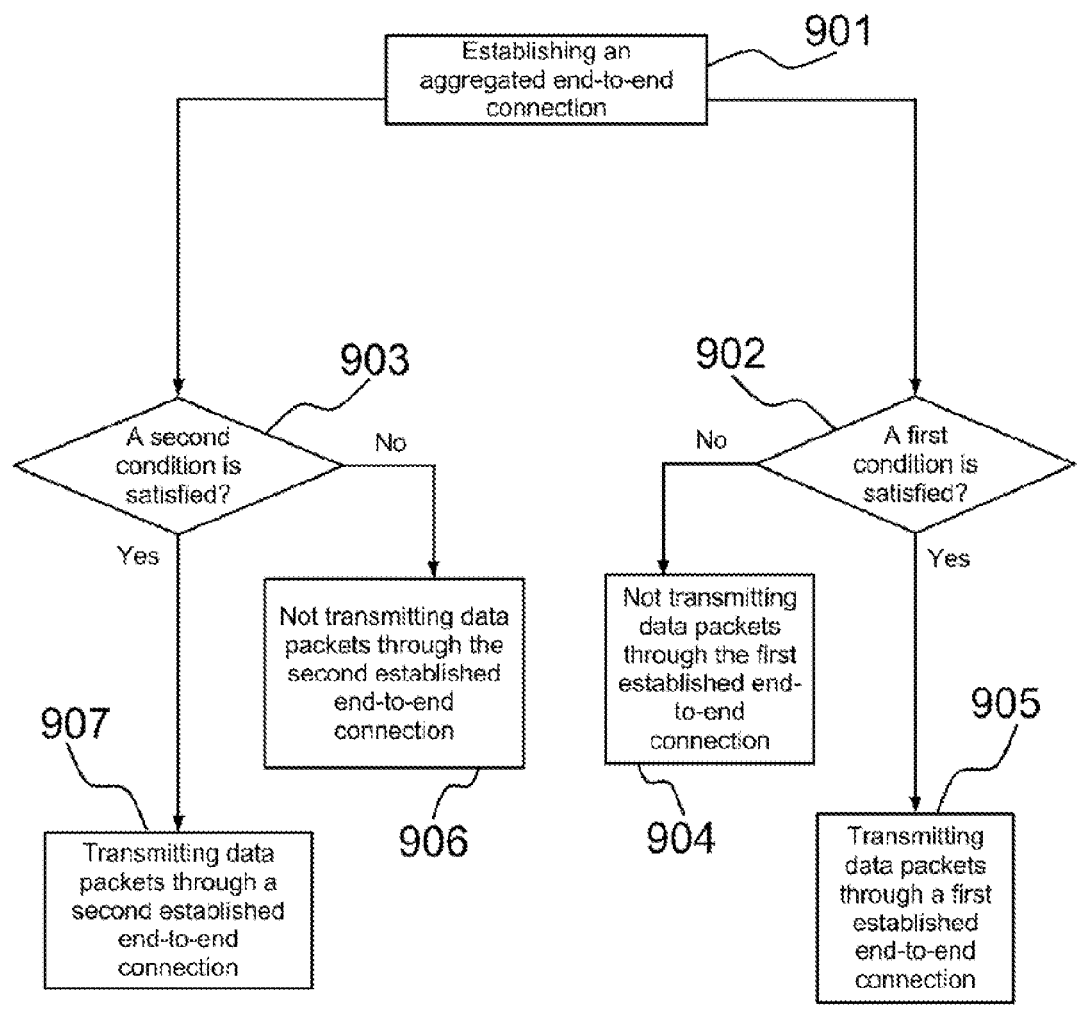
FIG. 9 is a flowchart illustrating a process of selecting established end-to-end connection(s) for transmitting data packets according to one of the embodiments.
Figure 10:
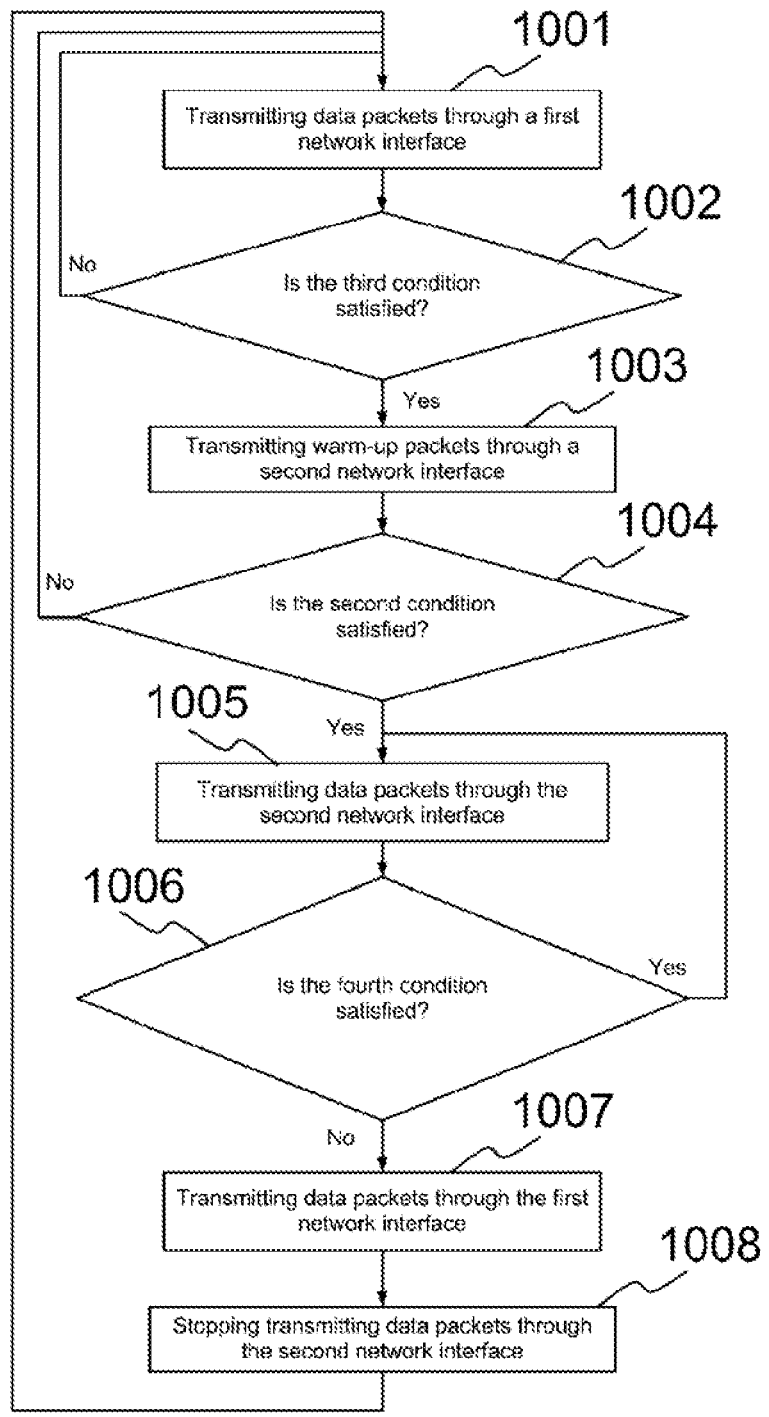
FIG. 10 is an illustration of a preferred embodiment according to the present invention.
Figure 11:
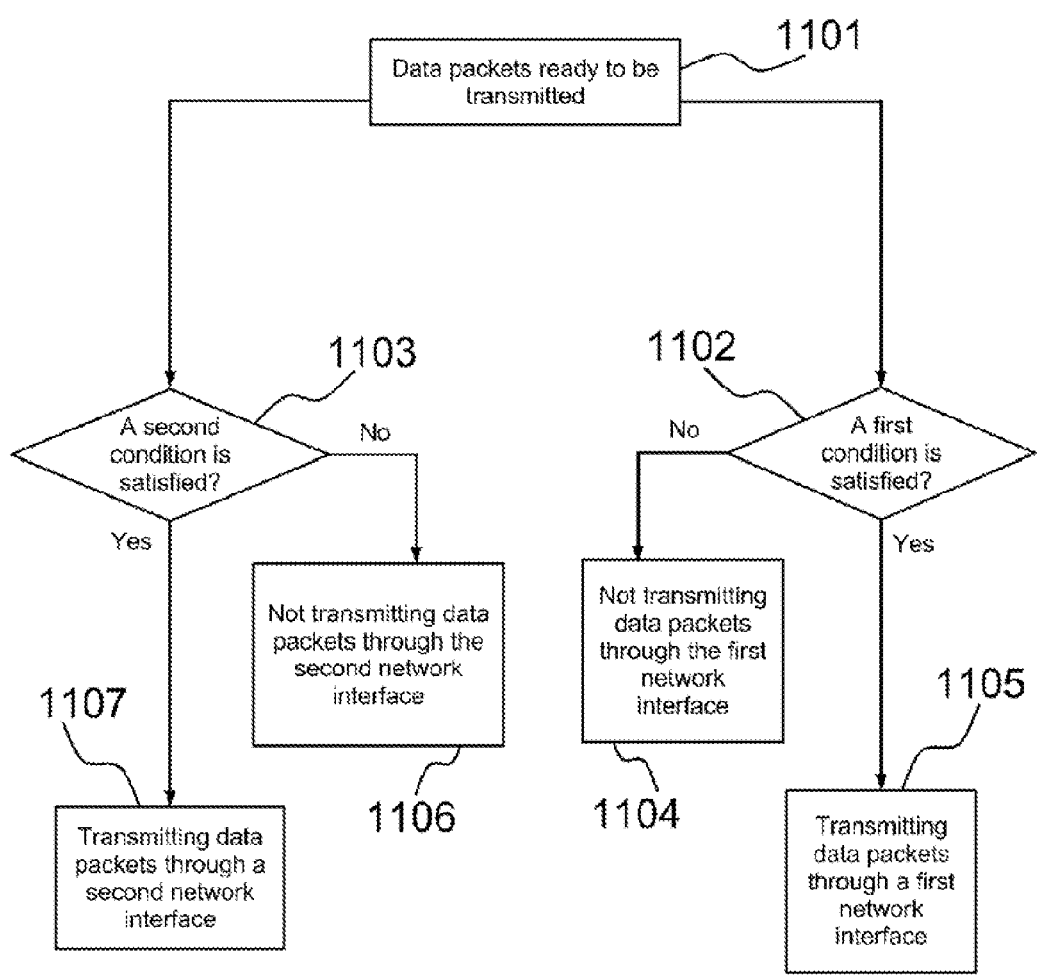
FIG. 11 is a flowchart illustrating a process of selecting network interface(s) for transmitting data packets according to one of the embodiments.

The invention claimed is:

1. A method for transmitting data packets at a first communications device comprising a plurality of network interfaces, comprising:

classifying the plurality of network interfaces into a first group of network interfaces, and a second group of network interfaces according to a first group of condition(s);

wherein the first group of network interfaces comprises network interfaces, including a first network interface, that satisfy all of the first group of conditions;

wherein the second group of network interfaces comprises network interfaces, including a second network interface, that satisfy at least one, but not all of the first group of conditions;

determining a specific data type, wherein data packets belonging to the specific data type are transmitted through the at least one of network interfaces of the second group of network interfaces;

transmitting data packets not belonging to the specific data type through at least one of network interfaces of the first group of network interfaces;

when the first group of network interfaces comprises no network interface, transmitting data packets through the second group of network interfaces;

transmitting no data packets through network interfaces not belonging to the first group of network interfaces or second group of network interfaces;

reclassifying the plurality of network interfaces periodically by determining periodically whether the plurality of network interfaces satisfy conditions of the first group of conditions;

removing the first network interface from the first group of network interfaces if the first network interface becomes not satisfying all of the first group of conditions;

removing the second network interface from the second group of network interfaces and classifying the second network interface into the first group of network interfaces if the second network interface becomes satisfying all of the first group of conditions;

wherein the first group of conditions are selected from the group consisting of service provider, geographical location, time, usage prices security, user identity, Internet Protocol address range, communication technology, and device.

2. The method of claim 1, wherein classifying or reclassifying is performed periodically by transmitting testing data, wherein the testing data is data packets, error correction packets, error detection packets, or management packets, through the plurality of network interfaces, wherein when the testing data is error correction packets or error detection packets, contents of testing data is based on one of more data packets.

3. The method of claim 1, wherein the first group of conditions are all satisfied when value of a first metric falls into one of a first plurality of thresholds.

4. The method of claim 1, further comprising:

maintaining the second network interface, wherein the maintaining is performed by transmitting packets periodically via the second network interface, wherein the packets are selected from a group consisting of error correction packets, management packets and data packets, and wherein data packets transmitted through the second network interface belong to the same session of data packets transmitted through the first network interface.

5. The method of claim 1, further comprising ranking network interfaces in the second group of network interfaces according to conditions satisfied by the network interfaces.

6. The method of claim 1, wherein data packets belonging to the specific type of data are management packets and error correction packets.

7. The method of claim 1, wherein the first group of conditions comprises a first condition, a second condition, and a third condition;
- wherein the first condition is satisfied if fewer than a first predefined number of packet loss within a first predefined time period is detected at the first network interface;
- wherein the second condition is satisfied if at least the first predefined number of packet, loss within the first predefined time period is detected at the first network interface; and
- wherein the third condition is satisfied if at least a third predefined number of packet loss within a third predefined time period is detected at the first network interface.

8. The method of claim 7, further comprising:
activating the second network interface when the second condition is satisfied;
removing the first network interface from the first group of network interfaces is performed when the third condition is satisfied; and
wherein the first group of network interfaces includes the first network interface when the first condition is satisfied.

9. The method of claim 1, further comprising transmitting at least one alert message to an administrator before removing the first network interface from the first group of network interfaces and before removing the second network interface from the second group of network interfaces.

10. The method of claim 1, wherein a fourth condition from the first group of conditions is based on service provider; wherein the first network interface satisfies the fourth condition when a connection established through the first network interface is provided by a first service provider.

11. The method of claim 1, wherein when the second network interface has high latency, the specific data type of data packets transmitted through the second network interface is, file transfer.

12. The method of claim 11, wherein a fifth condition from the first group of conditions is based on usage limit; and wherein the first network interface stops satisfying the fifth condition when the usage limit of a connection established through the first network interface is approaching.

13. The method of claim 10, wherein a sixth condition from the first group of conditions is based on user identity; and wherein the first network interface satisfies the sixth condition when the first communications device is used by a first user.

14. The method of claim 1, wherein a seventh condition from the first group of conditions is based on usage price; and wherein the first network interface satisfies the seventh condition when usage price of a connection established through the first network interface is below a price limit.

15. The method of claim 1, wherein the performance metric is selected from the group consisting of error rates, packet latency, packet jitter, quality of service, security, coverage area, dropped packet rate, round trip time, signal level, interference level, signal-to-interface ratio, and signal-to-noise ratio.

16. The method of claim 1, wherein the conditions are retrieved remotely from a remote server or retrieved locally from a local storage medium, and is received through a web interface, an application programming interface (API), a command line interface or a console.

17. A first communications device capable of transmitting data packets, comprising:
a plurality of network interfaces;
at least one processing unit;
at least one main memory;
at least one secondary storage storing program instructions executable by the at least one processing unit for:
- classifying the plurality of network interfaces into a first group of network interfaces, and a second group of network interfaces according to a first group of condition(s);
- wherein the first group of network interfaces comprises network interfaces, including a first network interface, that satisfy all of the first group of conditions;
- wherein the second group of network interfaces comprises network interfaces, including a second network interface, that satisfy at least one, but not all of the first group of conditions;
- determining a specific data type, wherein data packets belonging to the specific data type are transmitted through the at least one of network interfaces of the second group of network interfaces;
- transmitting data packets not belonging to the specific data type through at least one of network interfaces of the first group of network interfaces;
- when the first group of network interfaces comprises no network interface, transmitting data packets through the second group of network interfaces;
- transmitting no data packets through network interfaces not belonging to the first group of network interfaces or second group of network interfaces;
- reclassifying the plurality of network interfaces periodically by determining periodically whether the plurality of network interfaces satisfy conditions of the first group of conditions;
- removing the first network interface from the first group of network interfaces if the first network interface becomes not satisfying all of the first group of conditions;
- removing the second network interface from the second group of network interfaces and classifying the second network interface into the first group of network interfaces if the second network interface becomes satisfying all of the first group of conditions;
- wherein the first group of conditions are selected from the coup consisting of service provider, geographical location, time, usage price, security, user identity, Internet Protocol address range, communication technology, and device.

18. The first communications device of claim 17, wherein classifying or reclassifying is performed periodically by transmitting testing data, wherein the testing data is data packets, error correction packets, error detection packets, or management packets, through the plurality of network interfaces, wherein when the testing data is error correction packets or error detection packets, contents of testing data is based on one or more data packets.

19. The first communication device of claim 17, wherein the first group of conditions are all satisfied when value of a first metric falls into one of a first plurality of thresholds.

20. The first communications device of claim 17, wherein the at least one secondary storage further storing program instructions executable by the at least one processing unit for:
maintaining the second network interface, wherein the maintaining is performed by transmitting packets periodically via, the second network interface, wherein the packets are selected from a group consisting of error correction packets, management packets and data packets, and wherein data packets transmitted through the second network interface belong to the same session of data packets transmitted through the first network interface.

21. The first communications device of claim 17, wherein the at least one secondary storage further storing program instructions executable by the at least one processing unit for ranking network interfaces in the second group of network interfaces according to conditions satisfied by the network interfaces.

22. The first communication device of claim 17, wherein data packets belonging to the specific type of data are management packets and error correction packets.

23. The first communications device of claim 17, wherein the first group of conditions comprises a first condition, a second condition, and a third condition:
 wherein the first condition is satisfied if fewer than a first predefined number of packet loss within a first predefined time period is detected at the first network interface;
 wherein the second condition is satisfied if at least the first predefined number of packet loss within the first predefined time period is detected at the first network interface; and
 wherein the third condition is satisfied if at least a third predefined number of packet loss within a third predefined time period is detected at the first network interface.

24. The first communication device of claim 23, wherein the at least one secondary storage further storing program instructions executable by the at least one processing unit for:
 activating the second network interface when the second condition is satisfied removing the first network interface from the first group of network interfaces is performed when the third condition is satisfied; and
 wherein the first group of network interfaces includes the first network interface when the first condition is satisfied.

25. The first communications device of claim 17, wherein the at least one secondary storage further storing program instructions executable by the at least one processing unit for transmitting at least one alert message to an administrator before removing the first network interface from the first group of network interfaces and before removing the second network interface from the second group of network interfaces.

26. The first communication device of claim 17, wherein a fourth condition from the first group of conditions is based on service provider; wherein the first network interface satisfies the fourth condition when a connection established through the first network interface is provided by a first service provider.

27. The first communication device of claim 17, wherein when the second network interface has high latency, the specific data type of data packets transmitted through the second network interface is file transfer.

28. The first communications device of claim 17, wherein a fifth condition from the first group of conditions is based on usage limit and wherein the first network interface stops satisfying the fifth condition when the usage limit of a connection established through the first network interface is approaching.

29. The first communications device of claim 17, wherein a sixth condition from the first group of conditions is based on user identity; and wherein the first network interface satisfies the sixth condition when the first communications device is used by a first user.

30. The first communications device of claim 17, wherein a seventh condition from the first group of conditions is based on usage price; and wherein the first network interface satisfies the seventh condition when usage price of a connection established through the first network interface is below a price limit.

31. The first communications device of claim 17, wherein the performance metric is selected from the group consisting of, error rates, packet latency, packet jitter, quality of service, security, coverage area, dropped packet rate, round trip time, signal level, interference level, signal-to-interface ratio, and signal-to-noise ratio.

32. The first communication device of claim 17, wherein the conditions are retrieved remotely from a remote server or retrieved locally from a local storage medium, and is received through a web interface, an application programming interface (API), a command line interface or a console.

* * * * *